US011505069B2

(12) United States Patent
Wakitani et al.

(10) Patent No.: US 11,505,069 B2
(45) Date of Patent: Nov. 22, 2022

(54) INFORMATION PROCESSING DEVICE

(71) Applicant: HONDA MOTOR CO., LTD., Tokyo (JP)

(72) Inventors: Tsutomu Wakitani, Wako (JP); Satoshi Haneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 644 days.

(21) Appl. No.: 16/342,643

(22) PCT Filed: May 25, 2017

(86) PCT No.: PCT/JP2017/019605
§ 371 (c)(1),
(2) Date: Apr. 17, 2019

(87) PCT Pub. No.: WO2018/083828
PCT Pub. Date: May 11, 2018

(65) Prior Publication Data
US 2019/0241090 A1 Aug. 8, 2019

(30) Foreign Application Priority Data
Nov. 1, 2016 (JP) ............................ JP2016-214385

(51) Int. Cl.
*B60L 53/80* (2019.01)
*B60L 1/00* (2006.01)
(Continued)

(52) U.S. Cl.
CPC ................ *B60L 1/003* (2013.01); *B60L 1/02* (2013.01); *B60L 53/66* (2019.02); *B60L 53/68* (2019.02);
(Continued)

(58) Field of Classification Search
CPC ......... G01C 21/34; G01C 21/36; B60L 50/60; B60L 53/66; B60L 53/80
(Continued)

(56) References Cited

U.S. PATENT DOCUMENTS

2010/0094496 A1 4/2010 Hershkovitz et al.
2011/0257879 A1* 10/2011 Ishibashi ............ G01C 21/3676 701/533
(Continued)

FOREIGN PATENT DOCUMENTS

CN 102164773 A 8/2011
CN 102235880 A 11/2011
(Continued)

OTHER PUBLICATIONS

International Search Report, dated Aug. 15, 2017 (Aug. 15, 2017), 2 pages.
(Continued)

*Primary Examiner* — Charles A Fox
*Assistant Examiner* — Michael E Butler
(74) *Attorney, Agent, or Firm* — Rankin, Hill & Clark LLP

(57) ABSTRACT

An information processing device that is capable of executing processing corresponding to execution of replacement of an energy supply unit at a facility. A control server is provided with a control server control unit for acquiring device-related information on a driving device in which a mounted energy supply unit serving as an energy supply unit for supplying energy to a power source is replaceably mounted, and selecting a facility recommended to perform replacement of the energy supply unit out of facilities that store stored energy supply units serving as energy supply units replaceable with the mounted energy supply unit, and
(Continued)

that are able to replace the mounted energy supply unit with one of the stored energy supply units.

11 Claims, 15 Drawing Sheets

(51) Int. Cl.

| | |
|---|---|
| ***G01C 21/36*** | (2006.01) |
| ***B60L 53/68*** | (2019.01) |
| ***B60L 1/02*** | (2006.01) |
| ***G08G 1/0968*** | (2006.01) |
| ***H02J 7/00*** | (2006.01) |
| ***B60L 58/13*** | (2019.01) |
| ***G01C 21/34*** | (2006.01) |
| ***B60L 53/66*** | (2019.01) |
| *B60L 50/60* | (2019.01) |

(52) U.S. Cl.
CPC ............... *B60L 53/80* (2019.02); *B60L 58/13* (2019.02); *G01C 21/34* (2013.01); *G01C 21/36* (2013.01); *G08G 1/0968* (2013.01); *H02J 7/00* (2013.01); *H02J 7/0013* (2013.01); *B60L 50/60* (2019.02); *B60L 2240/34* (2013.01); *B60L 2240/622* (2013.01); *B60L 2240/72* (2013.01); *B60L 2250/16* (2013.01); *B60L 2260/52* (2013.01); *H02J 2310/48* (2020.01); *Y02T 10/70* (2013.01); *Y02T 90/16* (2013.01)

(58) Field of Classification Search
USPC ........................................................... 701/22
See application file for complete search history.

(56) References Cited

U.S. PATENT DOCUMENTS

| | | | | |
|---|---|---|---|---|
| 2012/0173134 | A1* | 7/2012 | Gutman | G01C 21/3476 701/400 |
| 2014/0114514 | A1* | 4/2014 | Crombez | B60W 20/13 701/22 |
| 2014/0277788 | A1* | 9/2014 | Forbes, Jr. | H02J 13/00017 700/286 |
| 2017/0043671 | A1* | 2/2017 | Campbell | G08G 1/0145 |
| 2018/0244167 | A1* | 8/2018 | Penilla | H01M 10/46 |

FOREIGN PATENT DOCUMENTS

| | | |
|---|---|---|
| JP | 2006-331405 | 12/2006 |
| JP | 2011-185785 | 9/2011 |
| JP | 2011-220961 | 11/2011 |
| JP | 2014-147197 | 8/2014 |
| JP | 2016-090227 | 5/2016 |
| JP | 2016-137755 | 8/2016 |
| WO | 2016/143374 | 9/2016 |

OTHER PUBLICATIONS

International Preliminary Examination Report, 6 pages.
International Preliminary Report on Patentability dated May 9, 2019, 10 pages.
European Search Report dated Oct. 18, 2019, 8 pages.
Ndian Office Action dated Dec. 2, 2021 from corresponding Indian application 201947019888, 6 pages.
Japanese Office Action dated Jul. 22, 2019, English translation included, 11 pages.
Chinese Office Action dated Jul. 22, 2022 issued in corresponding Chinese Application No. CN 201780064167.6; English machine translation included (15 pages).

* cited by examiner

G1

INFORMATION PROCESSING DEVICE

TECHNICAL FIELD

The present invention relates to an information processing device.

BACKGROUND ART

Conventionally, there has been known a driving device in which an energy supply unit is mounted replaceably and replaced with another energy supply unit having a sufficient residual quantity when the residual quantity of the energy supply unit decreases, thereby preventing insufficient supply of energy. For example, Patent Literature 1 describes a driving device (vehicle 10) in which an energy supply unit (battery 20) is mounted replaceably, and a device for mounting and removing the energy supply unit in and from the driving device.

CITATION LIST

Patent Literature

[Patent Literature 1]
Japanese Patent Laid-Open No. 2016-137755

SUMMARY OF INVENTION

Technical Problem

With respect to a driving device for preventing insufficient supply of energy by means of replacing an energy supply unit, it is assumed that replacement of the energy supply unit is performed at a facility where an energy supply unit having a sufficient residual quantity is stored. However, there has not been sufficient disclosure in the past about a technique for executing an appropriate process corresponding to the replacement of an energy supply unit at the facility.

The present invention has been made in view of the above circumstances, and has an object to provide an information processing device capable of executing a process corresponding to the replacement of an energy supply unit at a facility.

Solution to Problem

All contents of Japanese Patent Application No. 2016-214385 filed on Nov. 1, 2016 are included in this specification.

In order to attain the above object, an information processing device according to an aspect of the present invention is characterized by comprising a control unit for acquiring device-related information on a driving device in which a mounted energy supply unit serving as an energy supply unit for supplying energy to a power source is replaceably mounted, and selecting a facility recommended to perform replacement of the energy supply unit out of facilities that store a stored energy supply unit serving as an energy supply unit replaceable with the mounted energy supply unit, and that are able to replace the mounted energy supply unit with the stored energy supply unit.

According to the configuration of this aspect of the present invention, based on the device-related information on the driving device, the information processing device can select the facility suitable for the driving device to replace the energy supply unit while reflecting the peculiar circumstances of the driving device. That is, according to the foregoing configuration, the information processing device can execute processing corresponding to the execution of the replacement of the energy supply unit at the facility.

An aspect of the present invention is characterized in that a residual quantity of the stored energy supply unit is managed by a management device so as to be within a predetermined range during storage of the stored energy supply unit in the facility, and when the facilities are selected, the control unit transmits, to the management device, control data for instructing the management device to cause a residual quantity of a predetermined stored energy supply unit out of the stored energy supply units stored in the selected facilities to be equal to a target value over the predetermined range.

According to the configuration of this aspect of the present invention, deterioration of the stored energy supply unit stored in the facility can be suppressed.

An aspect of the present invention is characterized in that the control unit estimates a timing of performing replacement of the energy supply unit at the selected facility based on the device-related information, and transmits, to the management device, the control data for instructing the management device to cause the residual quantity of the predetermined stored energy supply unit to be equal to the target value before the estimated timing.

According to the configuration of this aspect of the present invention, before the energy supply unit is replaced at the facility, it is possible to make the residual quantity can be set to a sufficient state for a stored energy supply unit to be replaced with the mounted energy supply unit.

An aspect of the present invention is characterized in that the driving device is a moving object to be propelled with energy supplied by the mounted energy supply unit.

According to the configuration of this aspect of the present invention, with respect to the moving object propelled with the energy supplied by the mounted energy supply unit, based on the device-related information of the moving object, the information processing device can select a facility suitable to perform replacement of the energy supply unit while reflecting a characteristic that the moving object is propelled with the energy supplied from the mounted energy supply unit.

An aspect of the present invention is characterized in that the device-related information includes information on a position of the moving object, and the control unit selects the facility based on the device-related information while reflecting relationship between the position of the moving object and a position of the facility.

According to the configuration of this aspect of the present invention, the information processing device can select an appropriate facility that reflect the relationship between the position of the moving object and the position of the facility.

An aspect of the present invention is characterized in that the control unit preferentially selects a facility as the facility is closer to the position of the moving object.

Here, it is assumed that the moving object can more easily reach a facility as the facility is closer to the current position of the moving object. In consideration of this matter, according to the configuration of this aspect of the present invention, the convenience of the user can be improved.

An aspect of the present invention is characterized in that the device-related information includes information on a residual quantity of the mounted energy supply unit, and the control unit sets, as a candidate of the facility to be selected, a facility which the moving object can reach without causing shortage of the residual quantity of the mounted energy supply unit.

According to the configuration of this aspect of the present invention, occurrence of shortage of the residual quantity before the moving object reaches the facility can be suppressed.

An aspect of the present invention is characterized in that the device-related information includes information on a route on which the moving object travels up to a destination, and based on the device-related information, the control unit selects the facility while reflecting the route up to the destination.

According to the configuration of this aspect of the present invention, the information processing device can select an appropriate facility reflecting the route up to the destination.

An aspect of the present invention is characterized in that the control unit preferentially selects a facility as the facility causes a smaller delay in an arrival timing of the moving object at the destination.

According to the configuration of this aspect of the present invention, it is possible to suppress the delay in the arrival timing at the destination which is caused by the replacement of the energy supply unit via the facility, thereby enhancing the convenience of the user.

An aspect of the present invention is characterized in that the device-related information includes information on a residual quantity of the mounted energy supply unit, and the control unit selects one or more facilities at which replacement of an energy supply unit is performed up to the destination so that the moving object reaches the destination without causing shortage of the residual quantity of the mounted energy supply unit, schedules a route reaching the destination via the selected one or more facilities, and transmits information indicating the scheduled route to an external device.

According to the configuration of this aspect of present invention, the information processing device can suppress occurrence of shortage of the residual quantity until the moving object has reached the destination.

An aspect of the present invention is characterized in that the device-related information includes information on a load which is provided in the moving object and driven upon reception of energy supply from the mounted energy supply unit, and information on a residual quantity of the mounted energy supply unit, and in a predetermined case, the control unit transmits control data for controlling the load so as to reduce energy consumed by the load to a device mounted in the moving object.

According to the configuration of this aspect of the present invention, the information processing device can more surely prevent the occurrence of shortage of the residual quantity until the moving object has reached the facility.

An aspect of the present invention is characterized in that the control unit manages status of utilization of the facility, and selects the facility while reflecting the status of utilization of the facility.

According to the configuration of this aspect of the present invention, the information processing device can suppress occurrence of a waiting time at the facility and enhance the convenience of the user.

An aspect of the present invention is characterized in that the driving device is a vehicle traveling with energy supplied by the mounted energy supply unit.

According to the configuration of this aspect of the present invention, with respect to the vehicle traveling with the energy supplied by the mounted energy supply unit, based on the device-related information of the vehicle, the information processing device can select a facility suitable to perform the replacement of the battery BT while reflecting a characteristic that the vehicle travels with the energy supplied by the mounted energy supply unit.

Advantageous Effect of Invention

According to the aspects of the present invention, an information processing device capable of executing processing corresponding to replacement of an energy supply unit at a facility can be provided.

DESCRIPTION OF EMBODIMENTS

Embodiments according to the present invention will be described hereinafter with reference to the drawings.

First Embodiment

Figure 1:
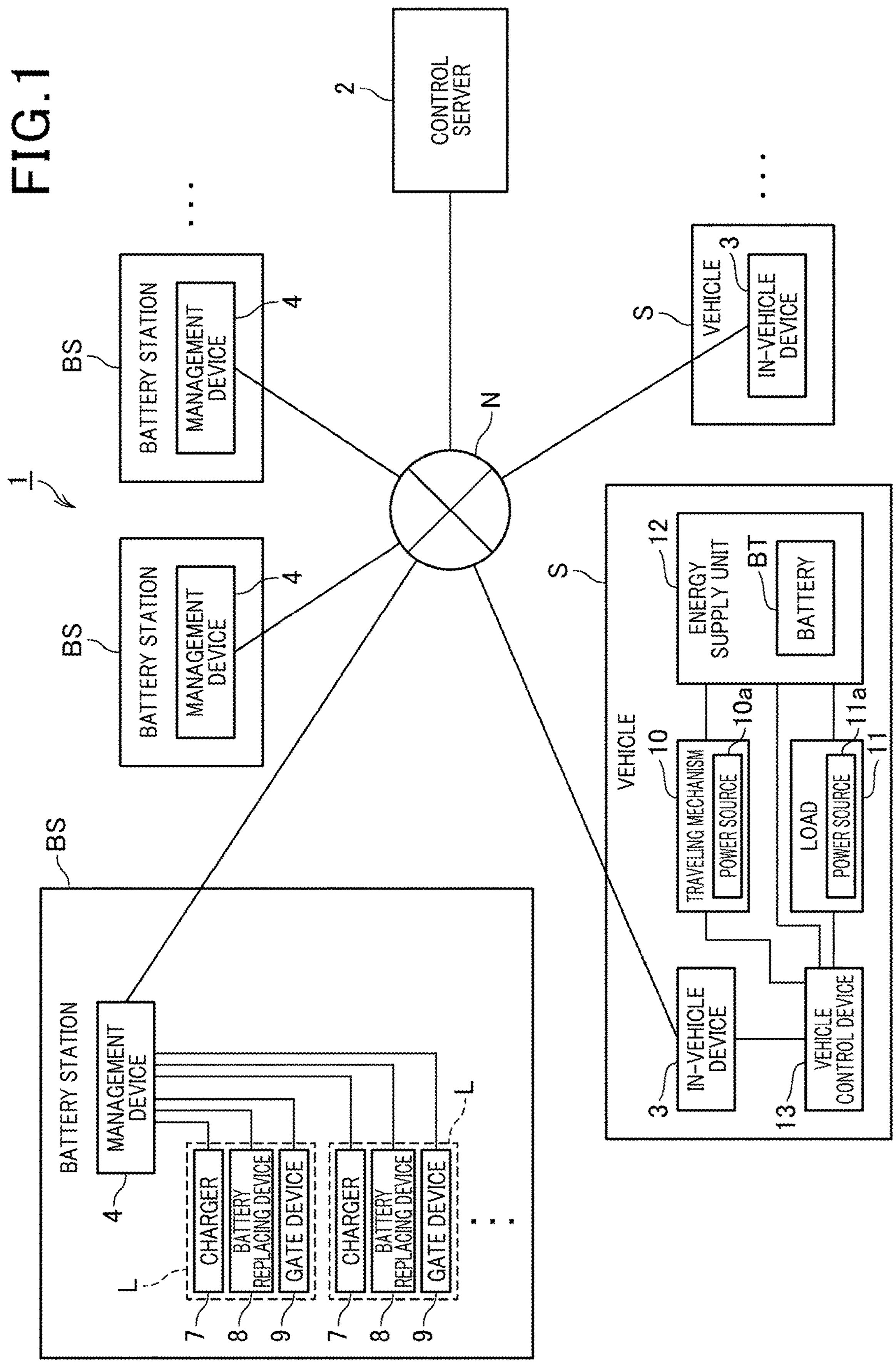
FIG. 1 is a diagram showing a configuration of an information processing system according to a first embodiment.

FIG. 1 is a diagram showing a configuration of an information processing system 1 according to the present embodiment.

As shown in FIG. 1, the information processing system 1 includes a control server 2 (information processing device) connectable to a network N configured to include the Internet or a telephone network. The control server 2 is a server device capable of communicating with an in-vehicle device 3 and a management device 4. In FIG. 1, the control server 2 is represented by one block, which does not mean that the control server 2 is configured by a single server device. The control server 2 may be configured to include plural server devices or may be a part of a predetermined system. That is, the control server 2 may have any form as long as the control server 2 has functions described below. Although details are omitted, secure communication is performed among the control server 2, the in-vehicle device 3, and the management device 4 by a predetermined encryption technique and other security-related techniques.

Hereinafter, a subject who utilizes the function of the control server 2 is generally referred to as a "user". The user includes a person (not limited to a driver) who gets in a vehicle S.

As shown in FIG. 1, the information processing system 1 includes the in-vehicle device 3 mounted in a vehicle S (driving device) (moving object).

The vehicle S according to the present embodiment is an electric vehicle in which a battery BT is mounted replaceably and which travels (is propelled) based on energy supplied from the battery BT.

As shown in FIG. 1, the vehicle S includes a travel mechanism 10, a load 11, and an energy supply unit 12.

The travel mechanism 10 is a mechanism for causing the vehicle S to travel or a mechanism (for example, a wiper, a blinker, etc.) mounted in the vehicle S, and is driven by a power source 10*a* configured to include an electric motor.

The load 11 is an air conditioner for conditioning the air in the interior of the vehicle S, and other mechanisms mounted in the vehicle S, and is driven by a power source 11*a* configured to include an electric motor.

Battery BT is a secondary battery for supplying energy. The energy supply unit 12 supplies energy from the battery BT mounted in the vehicle S to at least the power source 10*a* and the power source 11*a*.

In the vehicle S according to the present embodiment, when the battery residual quantity (remaining amount) of the battery BT decreases with energy consumption, the battery BT is replaced with a battery BT having a sufficient battery residual quantity, whereby the insufficient battery residual quantity (insufficient supply of energy) is prevented. Accordingly, as compared to such a type of electric vehicle that the battery BT is charged when the battery residual amount of the battery BT decreases, a time required until the battery residual quantity of the battery BT mounted in the vehicle S is set to a sufficient state is shorter, and it is convenient for the user in this point.

Hereinafter, the battery BT mounted in the vehicle S is referred to as a "mounted battery BTa" (mounted energy supply unit), and for convenience, it is distinguished from a "stored battery BTb" (stored energy supply unit).

As shown in FIG. 1, the vehicle S includes a vehicle control device 13. The vehicle control device 13 is configured to include an engine control unit (ECU), and outputs control signals to at least the travel mechanism 10 and the load 11 to control these mechanisms.

As shown in FIG. 1, the in-vehicle device 3 is mounted in the vehicle S. The in-vehicle device 3 is a car navigation system provided in a dashboard or the like of the vehicle S.

For example, the in-vehicle device 3 has a function of performing self-location detection for detecting the current position of the vehicle S. Furthermore, the in-vehicle device 3 may have a function of performing a vehicle position display for displaying the current vehicle position of the vehicle S on a map. Furthermore, the in-vehicle device 3 may have a function of performing a route search for searching a route to a destination. Furthermore, the in-vehicle device 3 may have a function of performing a route guidance for displaying a map and displaying a route to a destination on the map to guide a route to the destination, and may have other functions. Note that the in-vehicle device 3 is not limited to a car navigation system, and any device is possible as long as the device has a function described later.

The in-vehicle device 3 has a function of accessing the network N, and is capable of communicating with the control server 2. Furthermore, the in-vehicle device 3 and the vehicle control device 13 are communicably connected to each other.

As shown in FIG. 1, the information processing system 1 includes a management device 4 provided in a battery station BS.

The battery station BS is a facility capable of replacing the battery BT of the vehicle S. A battery BT replaceable with the mounted battery BTa mounted in the vehicle S is stored in the battery station BS. Hereinafter, the battery BT which has been stored in the battery station BS is referred to as a "stored battery BTb" (stored energy supply unit). The driver (user) of the vehicle S can replace the mounted battery BTa with the stored battery BTb in the battery station BS. In the present embodiment, as described later, the function of the control server 2 enables the user to smoothly perform the replacement of the battery BT at an appropriate timing at the battery station BS.

One or more lanes L are provided in the battery station BS. The replacement of the battery BT is performed in a lane L.

The management device 4 has a function of accessing the network N, and can communicate with equipment (including the control server 2) connected to the network N.

Furthermore, the management device 4 is communicably connected to a charger 7, a battery replacing device 8, and a gate device 9 which are provided for each lane L, and controls these devices.

The charger 7 includes a battery accommodating portion (not shown) for accommodating a battery BT, and charges the battery BT accommodated in the battery accommodating portion under the control of the management device 4. The charging of the battery BT by the charger 7 will be described later.

In the lane L, the battery replacing device 8 automatically replaces the mounted battery BTa mounted in the vehicle S with the stored battery BTb accommodated in the charger 7 under the control of the management device 4.

The gate device 9 will be described later.

Figure 2:
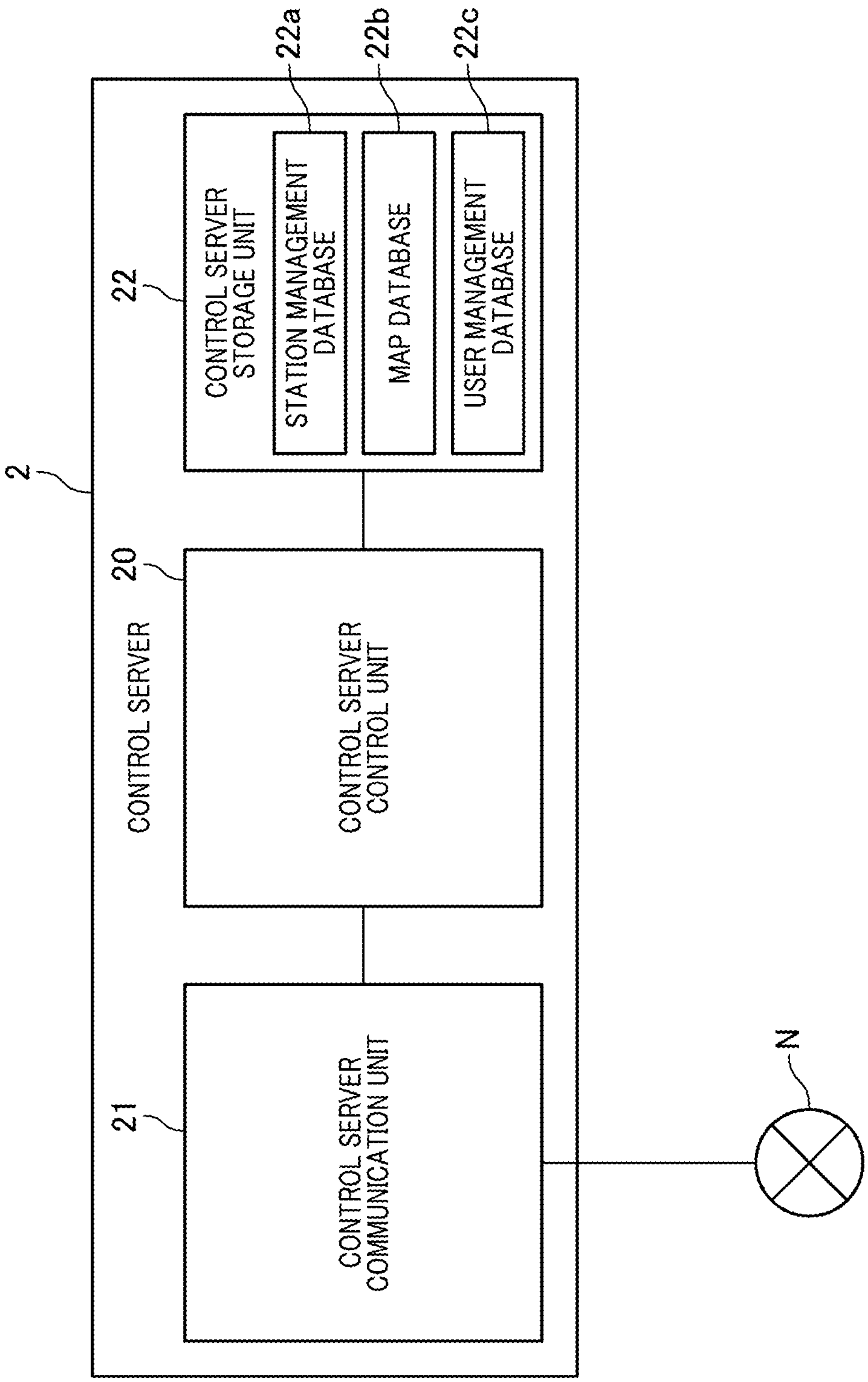
FIG. 2 is a block diagram showing a functional configuration of a control server.

FIG. 2 is a block diagram showing a functional configuration of the control server 2.

As shown in FIG. 2, the control server 2 includes a control server control unit 20 (control unit), a control server communication unit 21, and a control server storage unit 22.

The control server control unit 20 includes CPU, ROM, RAM, other peripheral circuits, and the like, and controls each unit of the control server 2. For example, the control server control unit 20 controls each unit of the control server 2 through cooperation between hardware and software, such as reading and executing a control program stored in the ROM by the CPU.

Under the control of the control server control unit 20, the control server communication unit 21 accesses the network N according to predetermined communication standards, and communicates with equipment connected to the network N.

The control server storage unit 22 includes a nonvolatile memory and stores various data rewritably. The control server storage unit 22 stores a station management database 22*a*, a map database 22*b*, and a user management database 22*c*. The station management database 22*a* and the user management database 22*c* will be described later. The map database 22*b* includes at least information on searching for a route on a map and guidance on a route. Specifically, the map database 22*b* includes node information having information on nodes corresponding to connection points on a road network such as intersections, link information having information on links corresponding to roads formed among nodes, and the like.

Figure 3:
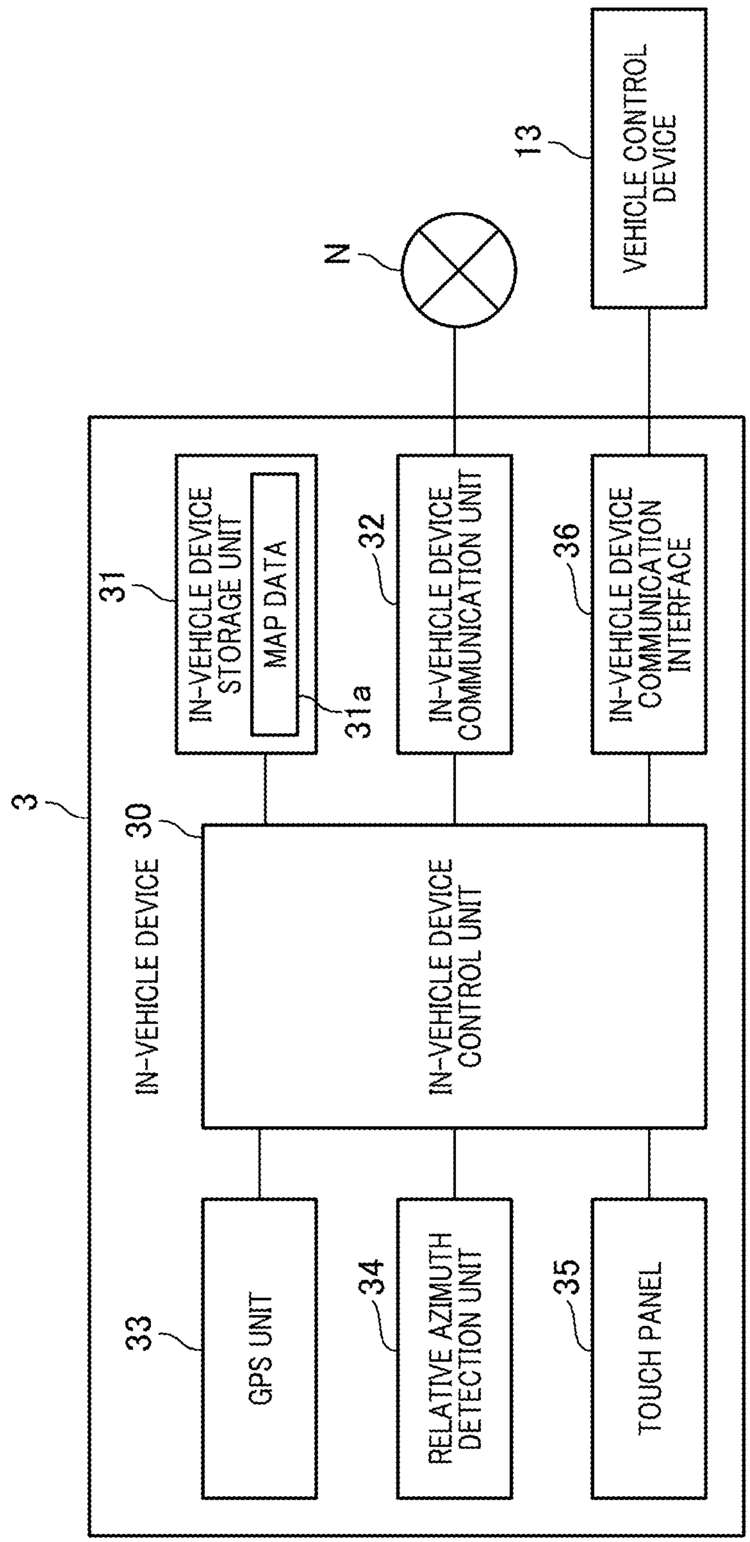
FIG. 3 is a block diagram showing a functional configuration of an in-vehicle device.

FIG. 3 is a block diagram showing a functional configuration of the in-vehicle device 3.

As shown in FIG. 3, the in-vehicle device 3 includes an in-vehicle device control unit 30, an in-vehicle device storage unit 31, an in-vehicle device communication unit 32, a GPS unit 33, a relative azimuth detection unit 34, a touch panel 35, and an in-vehicle device communication interface 36.

The in-vehicle device control unit 30 includes CPU, ROM, RAM, other peripheral circuits, and the like, and controls each unit of the in-vehicle device 3. For example, the in-vehicle device control unit 30 controls each unit of the in-vehicle device 3 by cooperation between hardware and software, such as reading and executing a control program stored in the ROM by the CPU.

The in-vehicle device storage unit 31 includes a nonvolatile memory and stores various data. The in-vehicle device storage unit 31 stores map data 31*a*. The map data 31*a* include drawing data relating to display of maps such as road drawing data relating to drawing of the shapes of roads, background drawing data relating to drawing of backgrounds such as landforms, character string drawing data relating to drawing of strings of administrative areas and the like. Furthermore, the map data 31*a* includes at least a part of the information possessed by the above-described map database 22*b*. The map data 31*a* may be configured to include information relating to searching for a route on a map and guidance on a route. More specifically, the map data 31*a* may be configured to include information relating to searching for a route and guidance of a route such as node information and link information. Furthermore, the map data 31*a* may include information on facilities on maps.

The in-vehicle device communication unit 32 accesses the network N according to predetermined communication standards under the control of the in-vehicle device control unit 30, and communicates with equipment (including the control server 2) connected to the network N. Any communication standards may be used as the communication standards used for the communication between the in-vehicle device 3 and the control server 2. The communication standards are, for example, HTTP or WebSocket.

In the present embodiment, the in-vehicle device 3 has a function of accessing the network N, and can communicate with equipment connected to the network N. However, the in-vehicle device 3 may be configured such that the in-vehicle device 3 does not have the function and communicates with an external device having a function of accessing the network N to access the network N via the external device. For example, the in-vehicle device 3 may make short-range wireless communication with equipment (for example, a so-called smartphone or a tablet computer) owned by a user getting in the vehicle S, and access the network N via the equipment.

The GPS unit 33 receives GPS radio waves from GPS satellites via a GPS antenna (not shown) and detects a current position and a traveling direction of the vehicle S from GPS signals superimposed on the GPS radio waves by calculation. The GPS unit 33 outputs a detection result to the in-vehicle device control unit 30.

The relative azimuth detection unit 34 includes a gyro sensor and an acceleration sensor. The gyro sensor is configured by, for example, a vibratory gyroscope, and detects a relative azimuth (for example, a turning amount in a yaw axis direction) of the vehicle S. The acceleration sensor detects an acceleration acting on the vehicle S (for example, the inclination of the vehicle S with respect to the traveling direction). The relative azimuth detection unit 34 outputs a detection result to the in-vehicle device control unit 30.

The in-vehicle device control unit 30 detects the current position of the vehicle S on the basis of an input from the GPS unit 33 and the relative azimuth detection unit 34 and the map data 31*a* according to a user's instruction or the like. Note that any method may be used as a method of detecting the current position of the vehicle S, and information other than the information exemplified above such as information indicating the vehicle speed may be used under detection. Furthermore, the in-vehicle device control unit 30 searches for a route from the detected current position of the vehicle S to a destination set by the user based on the map data 31*a* according to a user's instruction or the like. Furthermore, the in-vehicle device control unit 30 displays the route to the destination on the map according to a user's instruction or the like, and displays the detected current position of the vehicle S on the map to guide the route to the destination.

The touch panel 35 includes a display device such as a liquid crystal display panel or an organic EL display panel, and displays information on the display device under the control of the in-vehicle device control unit 30.

The touch panel 35 includes a touch sensor, and when a touch operation is performed on the touch panel 35, the touch panel 35 outputs, to the in-vehicle device control unit 30, a signal indicating a position where the touch operation is performed. The in-vehicle device control unit 30 executes corresponding processing based on the signal indicating the touch position input from the touch sensor.

The in-vehicle device communication interface 36 communicates with the vehicle control device 13 according to predetermined communication standards under the control of the in-vehicle device control unit 30.

Figure 4:
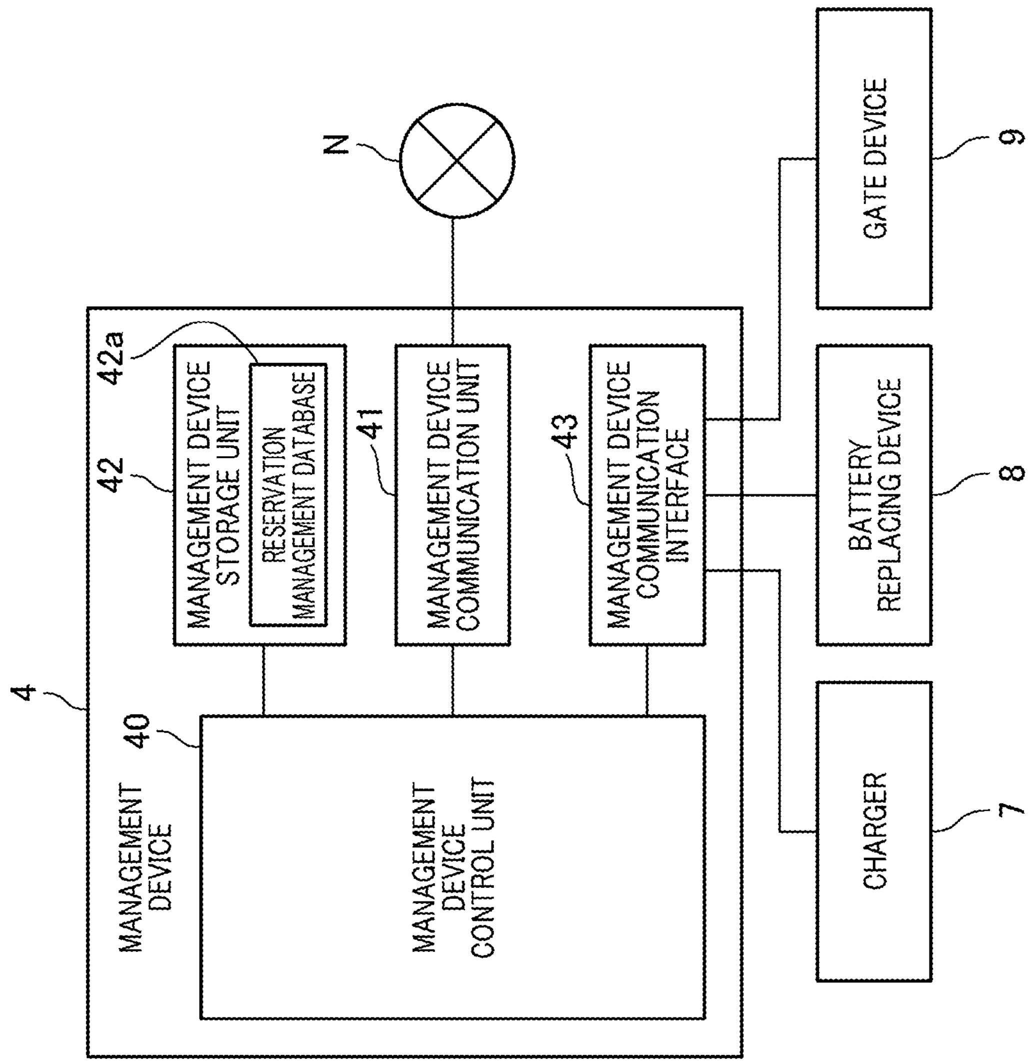
FIG. 4 is a block diagram showing a functional configuration of a management device.

FIG. 4 is a block diagram showing a functional configuration of the management device 4.

As shown in FIG. 4, the management device 4 includes a management device control unit 40, a management device communication unit 41, a management device storage unit 42, and a management device communication interface 43.

The management device control unit 40 includes CPU, ROM, RAM, other peripheral circuits, and the like, and controls each unit of the management device 4. For example, The management device control unit 40 controls each unit of the management device 4 by cooperation between hardware and software, such as reading and executing a control program stored in the ROM by the CPU.

Under the control of the management device control unit 40, the management device communication unit 41 accesses the network N according to predetermined communication standards, and communicates with equipment connected to the network N.

The management device storage unit 42 includes a nonvolatile memory and stores various data rewritably. The management device storage unit 42 stores a reservation management database 42*a*. The reservation management database 42*a* will be described later.

Under the control of the management device control unit 40, the management device communication interface 43 communicates with equipment connected to the management device 4 according to predetermined communication standards. In the present embodiment, at least the charger 7, the battery replacing device 8, and the gate device 9 are connected to the management device 4.

Incidentally, as described above, the vehicle S mounts the battery BT replaceably and travels with energy supplied by the battery BT. When the battery residual quantity of the battery BT decreases, the user needs to replace the battery BT at the battery station BS. In consideration of this matter, in the present embodiment, each device of the information processing system 1 executes the following processing regarding the replacement of the battery BT, so that the replacement of the battery BT is performed at an appropriate timing at an appropriate battery station BS.

Figure 5:
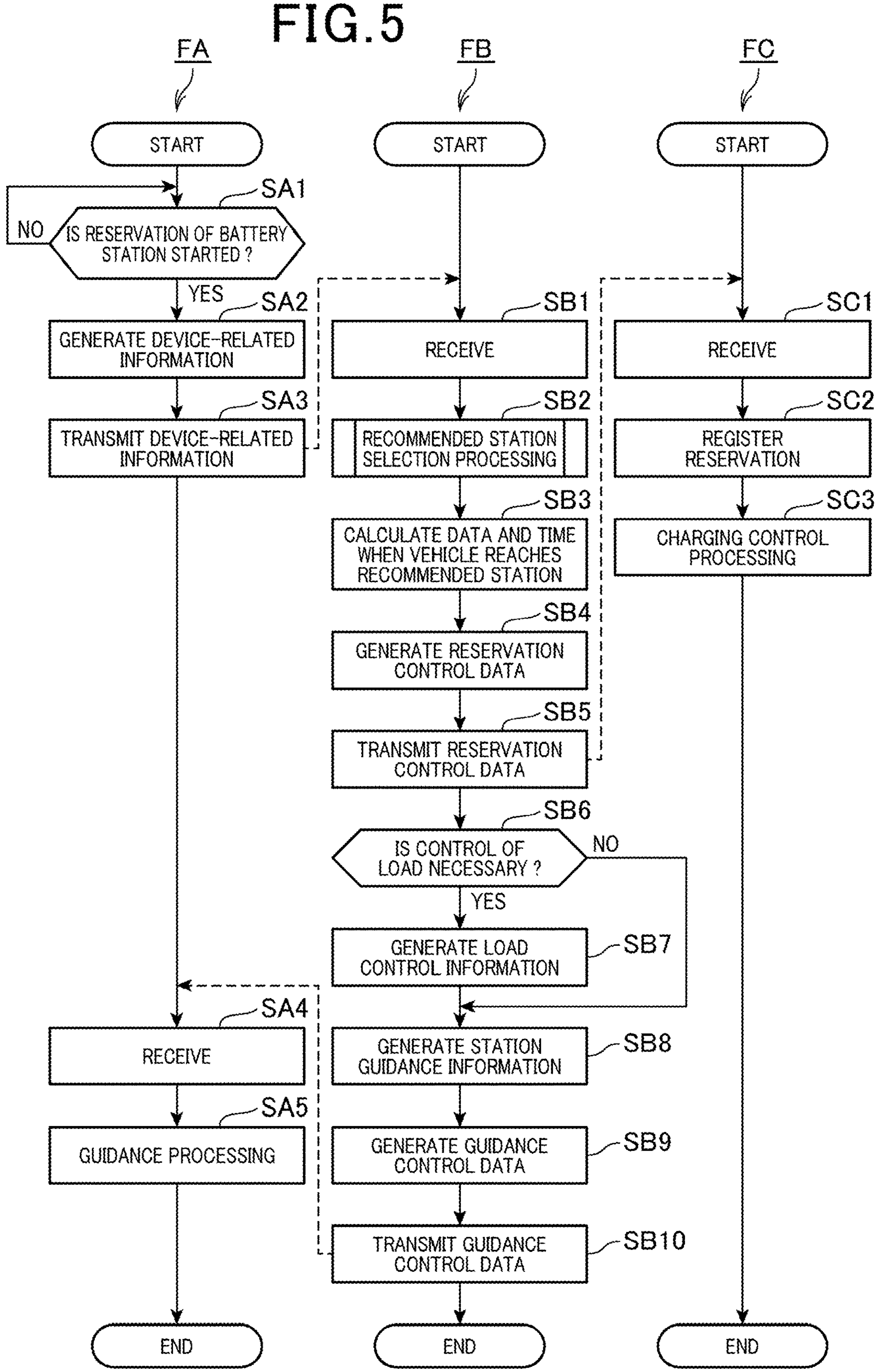
FIG. 5 is a flowchart showing operations of the in-vehicle device, the control server, and the management device.

FIG. 5 is a flowchart showing the operation of each device of the information processing system 1.

A flowchart FA in FIG. 5 shows an operation of the in-vehicle device 3, a flowchart FB shows an operation of the control server 2, and a flowchart FC shows an operation of the management device 4.

As shown in the flowchart FA of FIG. 5, the in-vehicle device control unit 30 of the in-vehicle device 3 regularly and intermittently determines whether a reservation of the battery station BS is started (step SA1). For example, the in-vehicle device control unit 30 performs the determination of step SA1 at an interval of one second.

In step SA1, the in-vehicle device control unit 30 determines to start the reservation of the battery station BS in the following cases.

That is, in step SA1, the in-vehicle device control unit 30 monitors whether the battery residual quantity of the mounted battery BTa has fallen below a predetermined threshold value, and the in-vehicle device control unit 30 determines to start the reservation of the battery station BS when the battery residual quantity has fallen below the predetermined threshold value. The predetermined threshold value is set to such a value that replacement of the mounted battery BTa is recommended in order to reliably prevent energy supply shortage when the battery residual quantity of the mounted battery BTa has fallen below the predetermined threshold value. The in-vehicle device control unit 30 regularly inquires about the battery residual quantity to the vehicle control device 13 that manages the battery residual quantity of the mounted battery BTa, and recognizes the battery residual quantity based on a response to the inquiry. Note that the in-vehicle device control unit 30 may be configured so as to ask the user whether to replace the battery BT at the battery station BS when the battery residual quantity of the mounted battery BTa has fallen below the predetermined threshold value.

In step SA1, the in-vehicle device control unit 30 determines to start the reservation of the battery station BS when there is an instruction from the user concerning the start of the reservation of the battery station BS. Here, the vehicle S is provided with a meter for displaying the battery residual quantity of the battery BT. The user checks the battery residual quantity displayed on the meter and instructs the start of the reservation of the battery station BS by a predetermined means as necessary.

When it is determined in step SA1 that the reservation of the battery station BS is to be started (step SA1: YES), the in-vehicle device control unit 30 generates device-related information J1 (step SA2).

The device-related information J1 includes battery residual quantity information J2, vehicle position information J3, destination route information J4, vehicle type information J5, battery standards information J6, load state information J7, user identification information J8, and number plate information J9.

The battery residual quantity information J2 is information indicating the battery residual quantity. The in-vehicle device control unit 30 communicates with the vehicle control device 13 to acquire the battery residual quantity information J2.

The vehicle position information J3 is information indicating the current position of the vehicle S. The in-vehicle device control unit 30 acquires the vehicle position information J3 based on an input from the GPS unit 33, an input from the relative azimuth detection unit 34, and the map data 31*a*.

The destination route information J4 is information indicating a route to a destination when the destination is set, and specifically, the destination route information J4 is information indicating a combination of links corresponding to roads from the current position of the vehicle S to the destination. The destination route information J4 is a null value when the destination is not set.

The vehicle type information J5 is information indicating the vehicle type of the vehicle S.

The battery standards information J6 is information indicating the standards of the battery BT mountable in the vehicle S.

The vehicle type information J5 and the battery standards information J6 are registered in advance in the in-vehicle device 3.

The load state information J7 is information indicating the state of the load. In the present embodiment, the load state information J7 is specifically information relating to the setting of the air conditioner provided in the vehicle S. The load state information J7 includes at least information indicating set temperature, information indicating an operation mode (heating, cooling, air blowing, or the like), and information indicating an air volume.

The user identification information J8 is information for uniquely identifying the user. Here, in order to utilize the function of the control server 2 for the reservation of the battery station BS, the user is required to perform membership registration in advance with respect to a service which is provided by a predetermined subject. When the membership registration to the service is completed, the user identification information J8 is allocated to the user, and registered in the in-vehicle device 3 by a predetermined means.

The number plate information J9 is information (information indicating a place name, classification information, hiragana information, and serial designation number) recorded on the number plate of the vehicle S. The number plate information J9 is registered in advance in the in-vehicle device 3.

After generating the device-related information J1, the in-vehicle device control unit 30 controls the in-vehicle device communication unit 32 to transmit the generated device-related information J1 to the control server 2 (step SA3). Note that information related to communication necessary for transmitting the device-related information J1 to the control server 2 is registered in advance. This information may include, for example, information on the address of the control server 2, the communication standards used for communication, the format of data when transmitting the device-related information J1, and the like.

As shown in the flowchart FB of FIG. 5, the control server control unit 20 of the control server 2 controls the control server communication unit 21 to receive the device-related information J1 (step SB1).

Note that upon reception of the device-related information J1, the control server control unit 20 performs user authentication and other necessary processing by using the user identification information J8 included in the information. In detail, information used for the user authentication is stored in the user management database 22*c* in association with the user identification information J8. By using this information, the control server control unit 20 communicates with the in-vehicle device 3 appropriately to authenticate the user.

Next, the control server control unit 20 executes recommended station selection processing (step SB2). The recommended station selection processing is processing of selecting a battery station BS that is recommended to be used, and generating information indicating a route to the battery station BS that is recommended to be used.

Figure 6:
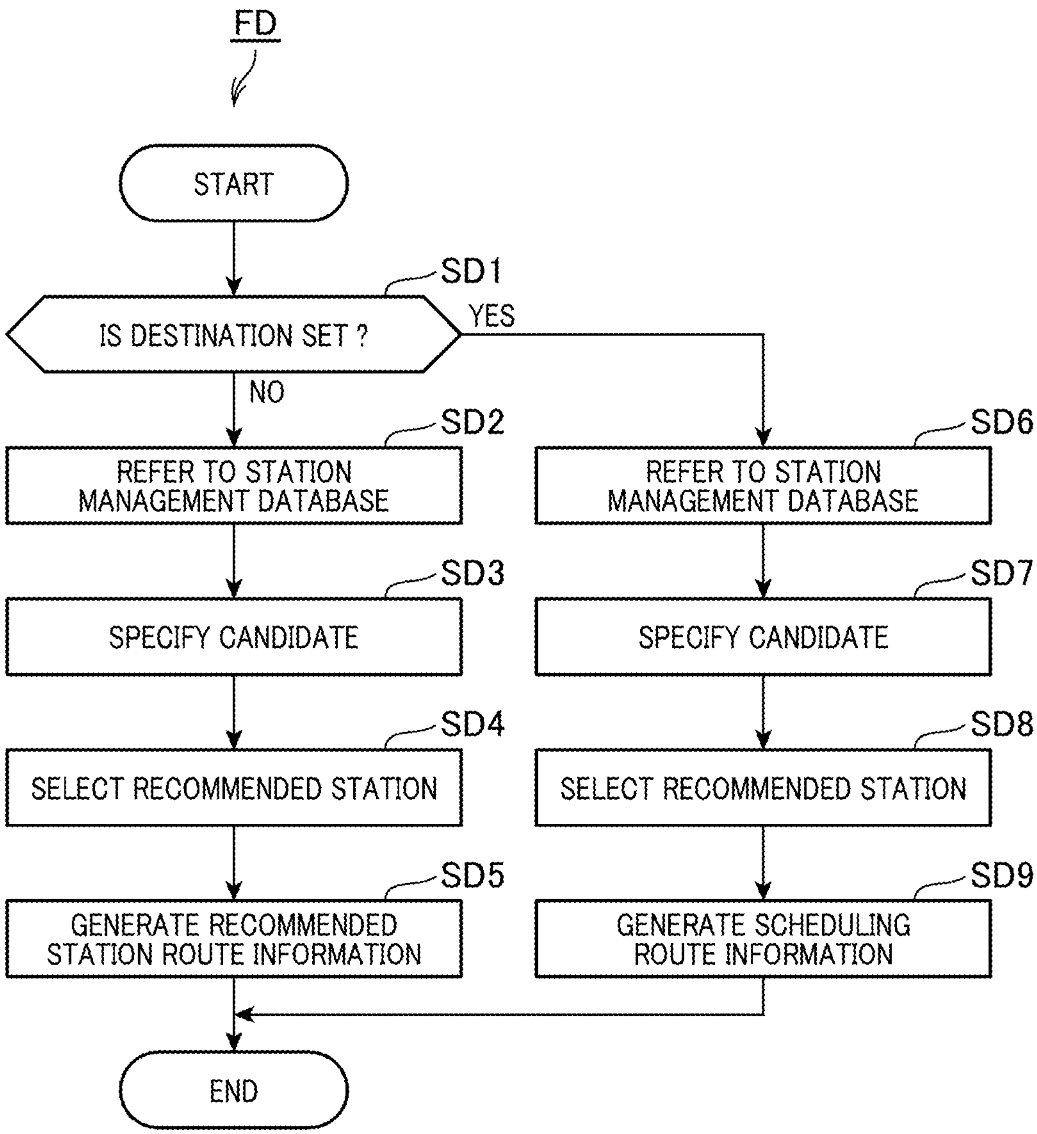
FIG. 6 is a flowchart showing details of recommended station selection processing.

The flowchart FD in FIG. 6 is a flowchart showing details of the recommended station selection processing.

As shown in the flowchart FD of FIG. 6, based on the destination route information J4 included in the received device-related information J1, the control server control unit 20 determines whether a destination has been set (step SD1).

When the destination is not set (step SD1: NO), the control server control unit 20 refers to the station management database DB1 (step SD2).

Figure 7:
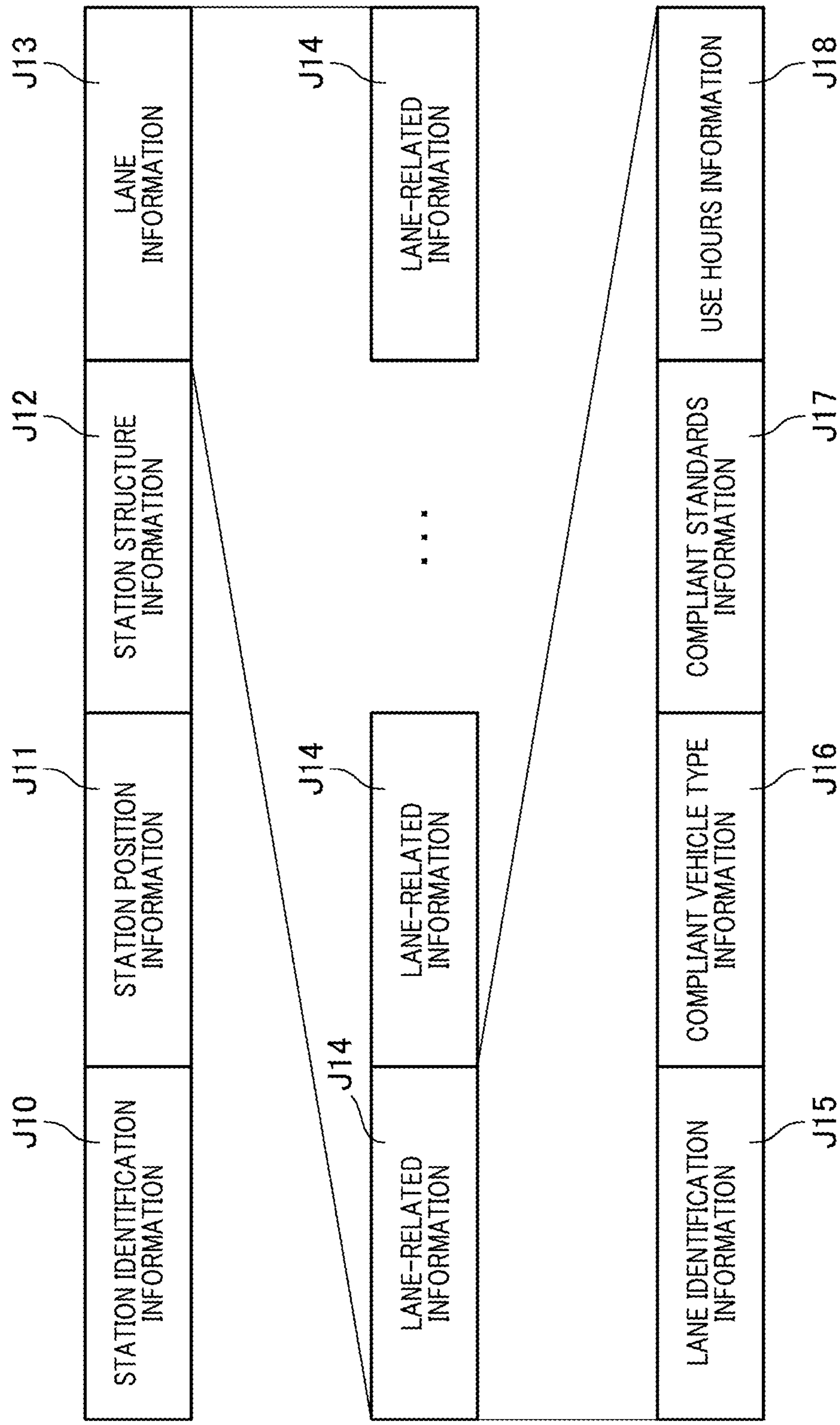
FIG. 7 is a diagram showing information held in a record of a station management database.

FIG. 7 is a diagram showing information held in the record of the station management database DB1.

The station management database DB1 has a record for each battery station BS. Each record has station identification information J10, station position information J11, station structure information J12, and lane information J13.

The station identification information J10 is identification information for uniquely identifying the battery station BS.

The station position information J11 is information indicating the position of the battery station BS.

The station structure information J12 is information on the structure of the battery station BS (a map of the battery station BS, information on a lane, etc.). The station structure information J12 includes information necessary for generating station guidance information J27 described later.

The lane information J13 has lane-related information J14 for each of lanes L provided in the battery station BS.

The lane-related information J14 has lane identification information J15, compliant vehicle type information J16, compliant standards information J17, and use hours information J18.

The lane identification information J15 is identification information for uniquely identifying the lane L.

The compliant vehicle type information J16 is information indicating a vehicle type for which the battery BT can be replaced in the lane L. The vehicle type for which the battery BT can be replaced in the lane L is predetermined so as to be compliant to the size of the lane L, the standards of the battery replacing device 8, and the like.

The compliant standards information J17 is information indicating the standards of the battery BT for which the replacement can be performed in the lane L.

The use hours information J18 is information indicating hours in which the lane L is used. In the case where the lane L is in use, hours from a current date and time until the use of the lane L is predicted to be completed is equivalent to at least the hours in which the lane L is used. When the use of the lane L is reserved, hours during which the lane L is predicted to be used in the reservation corresponds to the hours in which the lane L is used.

Here, as described later, based on the reservation management database 42*a*, the management device control unit 40 of the management device 4 manages the hours in which the lane L is used with respect to each of the lanes L provided in the battery station BS. The control server control unit 20 periodically inquires to the management device 4 about the hours in which the lane L is used, and updates the value of the use hours information J18 based on a response to the inquiry.

After referring to the station management database DB1 in step SD2, the control server control unit 20 specifies candidates for the recommended battery station BS based on the referred-to station management database DB1 (step SD3). Hereinafter, the candidates for the recommended battery station BS may be simply referred to as "candidates" appropriately.

More specifically, the control server control unit 20 specifies battery stations BS that the vehicle S can reach without causing shortage of the battery residual quantity, based on the battery residual quantity information J2 and the vehicle position information J3 included in the received device-related information J1, the station position information J11 held in each record of the station management database DB1, and the map database 22*b*. For example, the control server control unit 20 performs predetermined calculation processing based on the battery residual quantity information J2 and the vehicle position information J3 to calculate an area where the vehicle S can travel from the current position without causing shortage of the battery residual quantity. Next, the control server control unit 20 specifies battery stations BS belonging to a calculated travelable area based on the station position information J11 held in each record of the station management database DB1 and the map database 22*b*.

Next, the control server control unit 20 executes the following processing for each of the specified battery stations BS, and determines whether each of the specified battery stations BS should be set as a candidate. Hereinafter, a candidate to be subjected to the following processing will be referred to as a "target station".

That is, the control server control unit 20 calculates the date and time when the vehicle S reaches a target station in the case of the vehicle S traveling to the target station. Next, based on the use hours information J18 that the record corresponding to the target station in the station management database DB1 holds for each lane L, the control server control unit 20 determines whether there is a lane L which can be used at the date and time when the vehicle S reaches the target station. When there is no usable lane L, the control server control unit 20 does not set the target station as a candidate. Next, based on the vehicle type information J5 and the battery standards information J6 included in the received device-related information J1, and the compliant vehicle type information J16 and the compliant standards information J17 which are held for each lane L by the record corresponding to the target station in the station management database DB1, the control server control unit 20 determines whether there is a lane L allowing replacement of the mounted battery BTa of the vehicle S out of lanes L usable on the data and time when the vehicle S reaches the target station. When in this determination the lane L is a lane L compliant to the vehicle type of the vehicle S and the standards of the battery BT of the vehicle S, the control server control unit 20 determines that the lane allows replacement of the mounted battery BTa of the vehicle S.

When there is no lane L allowing replacement of the battery BT for the vehicle S, the control server control unit 20 does not set the target station as a candidate. On the other hand, when there is even one lane L allowing replacement of the battery BT for the vehicle S, the control server control unit 20 sets the target station as a candidate.

As described above, the control server control unit 20 sets, as candidates for the battery station BS to be selected, battery stations BS which the vehicle S can reach without causing shortage of the battery residual quantity of the mounted battery BTa out of the battery stations BS. According to this configuration, it is possible to effectively suppress occurrence of an insufficient battery residual quantity before the vehicle S reaches the battery station BS.

Furthermore, when the recommended battery station BS is selected, the control server control unit 20 manages the status of utilization of the battery station BS, and reflects the status of utilization of the battery station BS. According to this configuration, occurrence of a waiting time at the battery station BS can be suppressed, and convenience for the user can be improved.

After specifying the candidates as described above, the control server control unit 20 selects the recommended battery station BS from the candidates (step SD4).

Specifically, the control server control unit 20 preferentially selects a battery station BS among the candidates as the battery station BS is closer to the current position of the vehicle S. For example, the control server control unit 20 determines that a battery station BS is closer to the current position of the vehicle S as the distance of the straight line connecting the current position of the vehicle S and the position of the battery station BS is shorter. Furthermore, for example, the control server control unit 20 determines that a battery station BS is closer to the current position of the vehicle S as the travel distance of the vehicle S in the case of traveling of the vehicle S to the battery station BS is shorter. It can be assumed that the vehicle S can reach a battery station BS more easily as the battery station BS is closer to the current position of the vehicle S, and the convenience of the user can be improved by selecting the battery station BS recommended based on the above method.

Note that the control server control unit 20 may select the recommended battery station BS by reflecting not only the relationship between the current position of the vehicle S and the position of the battery station BS, but also other factors that affect the traveling until the vehicle S reaches the battery station BS. The other factors include, for example, a time which is estimated to be required for the vehicle S to reach the battery station BS, the degree of congestion on roads along which the vehicle S travels up to the battery station BS, the size of a road facing the battery station BS, etc., and one or more of these factors may be selected.

As described above, the control server control unit 20 reflects the relationship between the position of the vehicle S and the position of the battery station BS based on the received device-related information J1 to select the recommended battery station BS. More specifically, the control server control unit 20 preferentially selects a battery station BS as the battery station BS is closer to the position of the vehicle S.

According to this configuration, the convenience of the user can be improved.

In the following description, the battery station BS selected as the recommended battery station BS by the control server control unit 20 is referred to as a "recommended station".

Next, based on the station management database 22*a* and the map database 22*b*, the control server control unit 20 generates recommended station route information J20 indicating a route from the current position of the vehicle S to the recommended station (step SD5). After the processing of step SD5, the control server control unit 20 terminates the recommended station selection processing.

On the other hand, when it is determined, in step SD1, that the destination is set (step SD1: YES), the control server control unit 20 refers to the station management database DB1 (step SD6).

Next, based on the destination route information J4 included in the received device-related information J1 and the station management database DB1 referred to in step SD6, the control server control unit 20 specifies candidates for the recommended station by the following method (step SD7).

That is, the control server control unit 20 specifies battery stations BS inside a predetermined range as candidates for the recommended station from the route to the destination. Note that the control server control unit 20 calculates the distance between the route to the destination and a battery station BS, for example by drawing a perpendicular line from the battery station BS to a link corresponding to the route and calculating the distance between the battery station BS and an intersection between the perpendicular line and the link. By specifying candidates using such a method, it is possible to suppress a delay of an arrival timing at the destination which is caused by replacement of the battery BT via the battery station BS, thereby improving the convenience of the user. That is, the control server control unit 20 preferentially selects a battery station BS as the recommended station as the battery station BS causes a smaller delay in the arrival timing of the vehicle S at the destination.

Subsequently, the control server control unit 20 selects one or more battery stations BS to be passed through up to the destination as recommended stations from the candidates according to the following first rule to fourth rule (step SD8).

The first rule is a rule of causing the vehicle S to travel to the destination via the one or more battery stations BS selected as the recommended station, which makes it possible for the vehicle S to reach the destination without causing shortage of the battery residual quantity. By selecting the recommended station according to the first rule, it is possible for the vehicle S to reach the destination without causing shortage of the battery residual quantity.

The second rule is a rule of making the number of battery stations to be passed through up to the destination be as small as possible. By selecting the recommended station according to the second rule, it is possible to suppress the delay of the arrival timing at the destination which is caused by replacement of the battery BT via the battery station BS, thereby improving the convenience of the user.

The third rule is a rule of selecting, as a recommended station, a battery station BS having a lane L which is compliant to the vehicle type of the vehicle S and the standards of the battery BT mountable in the vehicle S when the vehicle S reaches the battery station BS. When conformance of the third rule is determined, with respect to the date and time at which the vehicle S is estimated to reach one battery station, the control server control unit 20 also reflects a time period required for replacement of the battery BT at the other battery stations BS to be passed through before the vehicle S passes through the one battery station BS in the date and time.

A fourth rule is a rule of making the battery residual quantity be sufficient to the extent that the vehicle S is capable of reaching any battery station BS from the destination without causing shortage of the battery residual quantity when the vehicle S has reached the destination. By selecting a recommended station according to the fourth rule, it is possible to prevent occurrence of shortage of the battery residual quantity after reaching the destination.

After selecting one or more recommended stations, the control server control unit 20 generates scheduling route information J21 indicating a route to reach the destination from the current position of the vehicle S via the one or more recommended stations based on the station management database 22*a* and the map database 22*b* (step SD9). After the processing of step SD9, the control server control unit 20 terminates the recommended station selection processing.

As shown in the flowchart FB of FIG. 5, after executing the recommended station selection processing, the control server control unit 20 calculates the date and time (timing) at which the vehicle S reaches a recommended station (each of plural recommended stations when the plural recommended stations are selected) (step SB3).

In the following description, for convenience of description, it is assumed that the control server control unit 20 selects one recommended station in the recommended station selection processing. Although details are omitted, when plural recommended stations are selected, the control server control unit 20 executes generation and transmission of reservation control data described below for each of the plural recommended stations.

Next, the control server control unit 20 generates reservation control data (control data) (step SB4).

Specifically, in step SB4, the control server control unit 20 acquires lane identification information J15 of any one lane L out of lanes L which are not used at the recommended station when the vehicle S reaches the recommended station and are compliant to the vehicle type of the vehicle S and the standards of the battery BT mountable in the vehicle S. The lane L corresponding to the acquired lane identification information J15 is a lane L which the vehicle S uses to replace the battery BT at the recommended station. Hereinafter, the lane L which the vehicle S uses to replace the battery BT is referred to as a "use lane".

Next, the control server control unit 20 generates reservation control data which includes the acquired lane identification information J15, the arrival date-and-time information J22 indicating the date and time calculated in step SB3, and the number plate information J9 included in the received device-related information J1, and indicates the following items. That is, the reservation control data instructs to reserve that the vehicle S corresponding to the number plate information J9 uses the lane L corresponding to the lane identification information J15 at the date and time indicated by the arrival date-and-time information J22. Furthermore, the reservation control data instructs that the battery residual quantity of a stored battery BTb to be replaced with the mounted battery BTa in the lane L corresponding to the lane identification information J15 will have reached a target value (described later) by the date and time indicated by the arrival date-and-time information J22.

Next, the control server control unit 20 controls the control server communication unit 21 to transmit the reservation control data generated in step SB4 to the management device 4 provided in the recommended station (step SB5). Note that information on communication necessary for transmitting the reservation control data to the management device 4 is registered in advance. This information may include, for example, information on the address of the management device 4 and communication standards used for communication.

As shown in the flowchart FC of FIG. 5, the management device control unit 40 of the management device 4 controls the management device communication unit 41 to receive the reservation control data (step SC1).

Next, based on the received reservation control data, the management device control unit 40 registers one record corresponding to the reservation in the reservation management database 42*a* (step SC2).

Figure 8:
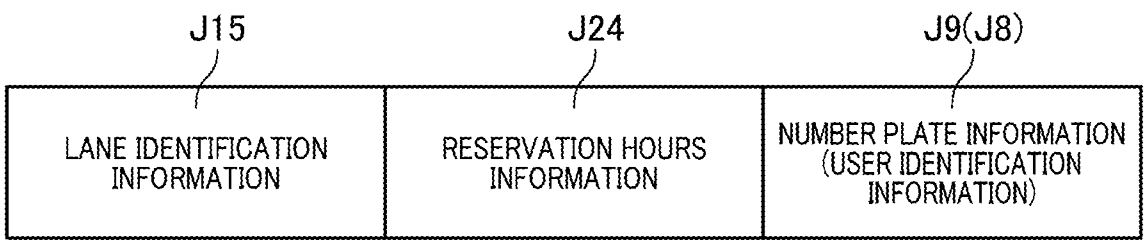
FIG. 8 is a diagram showing information held in a record of a reservation management database 42*a*.

FIG. 8 is a diagram showing information included in the record of the reservation management database 42*a*.

As shown in FIG. 8, the record of the reservation management database 42*a* has lane identification information J15, reserved hours information J24 (described later), and number plate information J9. In a second embodiment described later, the record in the reservation management database 42*a* has the user identification information J8 instead of the number plate information J9.

In step SC2, based on the arrival date-and-time information J22 included in the reservation control data, the management device control unit 40 calculates hours in which the lane L corresponding to the lane identification information J15 included in the reservation control data is used. The information indicating the calculated hours is the reserved hours information J24. The management device control unit 40 manages the time required for replacing the battery BT in each lane L, and sets, as hours in which the lane L is used, hours which starts with the arrival date-and-time information J22 as a start point and corresponds to the above time. Next, the management device control unit 40 resisters, in the reservation management database 42*a*, a record having the lane identification information J15 included in the reservation control data, the reserved hours information J24 indicating the calculated hours, and the number plate information J9 included in the reservation control data.

Next, the management device control unit 40 executes charging control processing based on the received reservation control data (step SC3). Hereinafter, the processing of step SC3 will be described in detail.

Here, under the control of the management device 4, the stored battery BTb accommodated in the battery accommodating portion of the charger 7 is managed so that the battery residual quantity is within a predetermined range (hereinafter referred to "storage range") while the stored battery BTb is stored in the battery accommodating portion (while stored at the battery station BS). The storage range is set to a range that can suppress deterioration of the battery BT and can reach a target value in a short time when charging of the battery BT is started. The target value is a value which exceeds the storage range and is sufficient as the battery residual quantity of a battery BT to be newly mounted in the vehicle S. The stored battery BTb is managed so that the battery residual quantity of the stored battery BTb is set within the storage range while the stored battery BTb is accommodated in the battery accommodating portion of the charger 7, whereby the deterioration of the battery BT can be appropriately suppressed, and when the stored battery BTb is required to be replaced with the mounted battery BTa, the battery residual quantity can be quickly set to a target value. The storage range is set to, for example, 40% to 60%, and the target value is set to, for example, 95%.

In the charging control processing of step SC3, the management device control unit 40 controls the charger 7 provided in the lane L (use lane) corresponding to the lane identification information J15 included in the reservation control data, and charges the stored battery BTb so that the battery residual quantity reaches the target value by the arrival date-and-time information J22 included in the reservation control data.

More specifically, the management device control unit 40 starts charging for the purpose of setting the battery residual quantity to a target value so that the battery residual quantity of the stored battery BTb reaches the target value at a timing before a predetermined time period from the date-and-time indicated by the arrival date-and-time information J22. The charging to set the battery residual quantity to the target value may be performed by rapid charging. The timing before the predetermined time period from the date and time indicated by the arrival date-and-time information J22 is, for example, 10 minutes before the date and time concerned, or for example, 1 hour before the date and time concerned. The management device control unit 40 is capable of calculating a time period required for charging to set the stored battery BTb to the target value, and the management device control unit 40 calculates the time period required for the charging, and calculates the timing to start the charging based on a calculation result. Then, the management device control unit 40 monitors whether the timing to start the charging has come, and starts the charging when the timing has come.

By performing such processing in the charging control processing, it is possible to shorten a time period for charging to set the stored battery BTb to the target value, shorten a time period of a state where the battery residual quantity of the stored battery BTb has been over the storage range, and more effectively suppress deterioration of the battery BT.

As shown in the flowchart FB of FIG. 5, after transmitting the reservation control data, the control server control unit 20 determines based on the load state information J7 included in the received device-related information J1 whether it is necessary to control the load 11 (the air conditioner provided in the vehicle S in the present embodiment) so that the vehicle S can surely reach the recommended station (step SB6).

Specifically, the control server control unit 20 estimates the battery residual quantity of the mounted battery BTa when the vehicle S reaches the recommended station. Subsequently, when the estimated battery residual quantity is lower than a predetermined threshold value, the control server control unit 20 controls the load 11, and determines that it is necessary to suppress energy to be consumed by the load 11 while the vehicle S travels to the recommended station. The suppression of the energy to be consumed by the load 11 makes it possible for the vehicle S to surely reach the recommended station, for example, even when the vehicle S is caught in a heavy congestion or when the vehicle S is required to make a detour due to an unexpected accident or a road regulation.

When it is determined in step SB6 that it is necessary to control the load 11 (step SB6: YES), the control server control unit 20 generates load control information J26 for controlling the load 11 so as to reduce the energy to be consumed by the load 11 based on the load state information J7 included in the received device-related information J1 (step SB7). In step SB7, for example, the control server control unit 20 changes the set temperature to a predetermined temperature according to the operation mode of the air conditioner so that the energy consumed by the load 11 per unit time decreases, and generates load control information J26 for changing the air volume to a predetermined level. After the processing in step SB7, the control server control unit 20 shifts the processing procedure to step SB8.

On the other hand, when it is determined in step SB6 that it is unnecessary to control the load 11 (step SB6: NO), the control server control unit 20 shifts the processing procedure to step SB8.

In step SB8, the control server control unit 20 generates station guidance information J27 based on the station structure information J12.

The station guidance information J27 is information used when the user is guided to a procedure of replacing the battery BT at the recommended station. The station guidance information J27 may include information indicating the address of the recommended station, information indicating the telephone number of the recommended station, and information indicating the name of the recommended station. As described later, the in-vehicle device 3 displays the information for guiding the user to the procedure of replacing the battery BT at the recommended station based on the station guidance information J27. The content of the station guidance information J27 will be described later through an explanation of the processing executed by the in-vehicle device 3 based on the above information.

Next, the control server control unit 20 generates guidance control data (step SB9).

The guidance control data includes the recommended station route information J20 generated in step SD5 or the scheduling route information J21 generated in step SD9. When the load control information J26 is generated in step SB7, the guidance control data includes the load control information J26. Furthermore, the guidance control data includes the station guidance information J27 generated in step SB8.

The guidance control data including the load control information J26 corresponds to "control data for controlling the load 11 so that the energy to be consumed by the load 11 is reduced".

Next, the control server control unit 20 controls the control server communication unit 21 to transmit the guidance control data to the in-vehicle device 3 (step SB10).

As shown in the flowchart FA of FIG. 5, the in-vehicle device control unit 30 of the in-vehicle device 3 controls the in-vehicle device communication unit 32 to receive the guidance control data (step SA4).

Subsequently, the in-vehicle device control unit 30 executes guidance processing based on the received guidance control data (step SA5).

Figure 9:
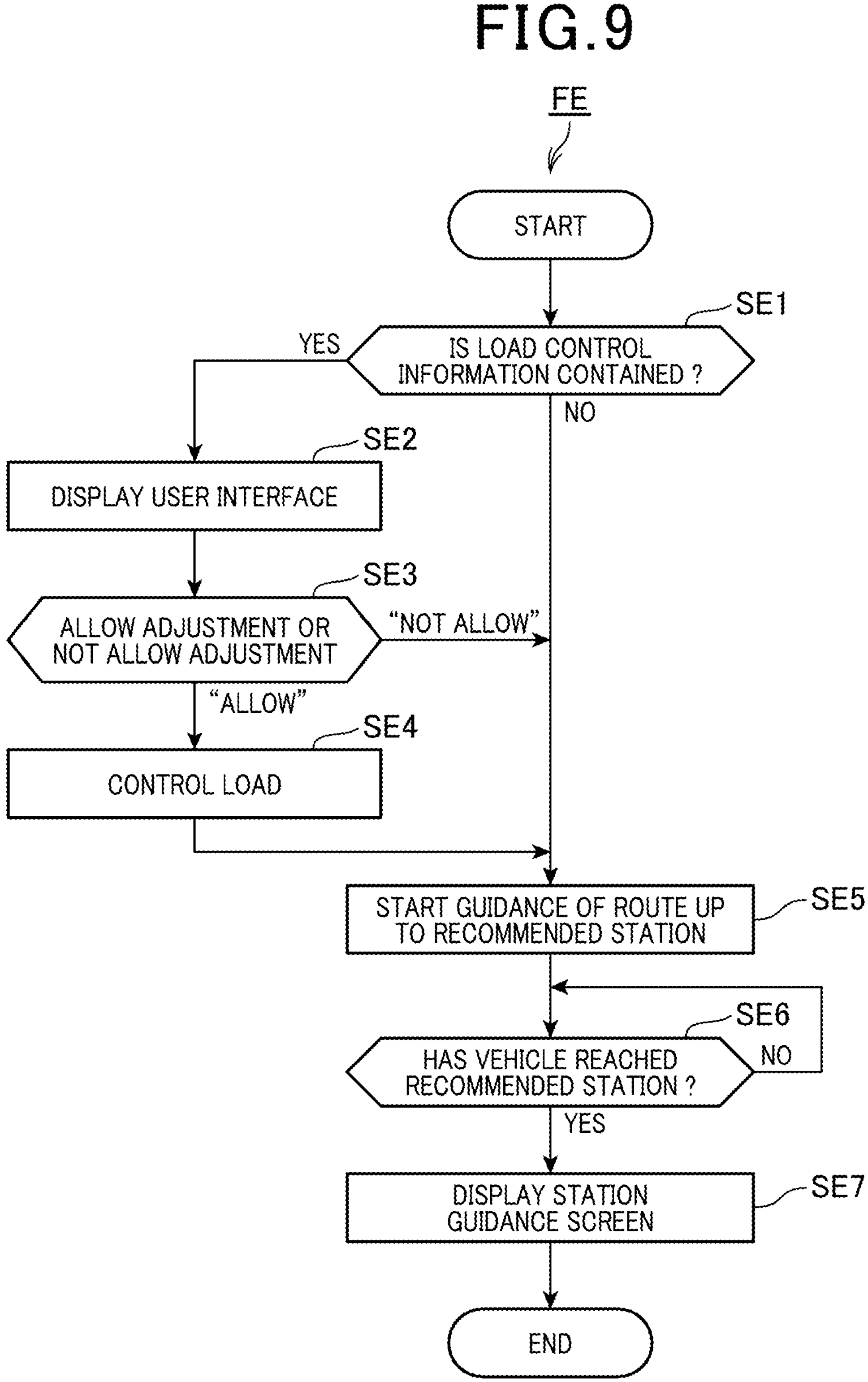
FIG. 9 is a flowchart showing details of guidance processing.

A flowchart FE in FIG. 9 is a flowchart showing details of the guidance processing.

As shown in the flowchart FE of FIG. 9, the in-vehicle device control unit 30 of the in-vehicle device 3 determines whether the load control information J26 is included in the received guidance control data (step SE1).

When the load control information J26 is not included (step SE1: NO), the in-vehicle device control unit 30 shifts the processing procedure to step SE5.

When the load control information J26 is included (step SE1: YES), the in-vehicle device control unit 30 displays, on the touch panel 35, a user interface for inquiring about whether it is allowed to adjust the set temperature and the air volume in order to reduce the energy to be consumed for the air conditioner (load 11) (Step SE2). The user can provide the user interface with an input indicating that adjustment is allowed or an input indicating that adjustment is not allowed.

Subsequently, the in-vehicle device control unit 30 determines whether the user interface is provided with an input indicating that adjustment is allowed or an input indicating that adjustment is not allowed (step SE3).

When there is an input indicating that adjustment is allowed (step SE3: "allowed"), the in-vehicle device control unit 30 outputs a control signal to the vehicle control device 13 based on the load control information J26 to control the load 11 (Step SE4). As a result, the energy consumed by the load 11 (air conditioner) is reduced. After the processing of step SE4, the in-vehicle device control unit 30 shifts the processing procedure to step SE5.

On the other hand, when there is an input indicating that adjustment is not allowed (step SE3: "not allowed"), the in-vehicle device control unit 30 shifts the processing procedure to step SE5 without executing the control of the load 11 based on the load control information J26.

In step SE5, the in-vehicle device control unit 30 starts guidance of a route to a recommended station based on the recommended station route information J20 or the scheduling route information J21 included in the received guidance control data. When the scheduling route information J21 is included in the guidance control data, the in-vehicle device control unit 30 starts guidance of a route to a recommended station to be next passed through.

In step SE5, the in-vehicle device control unit 30 displays a map of a predetermined scale on the touch panel 35 based on the map data 31*a* and also displays, on the map, a mark indicating the current position of the vehicle S and a route from the current position of the vehicle S to the recommended station, thereby guiding the route to the recommended station.

A program having a function of guiding the route to the recommended station based on the recommended station route information J20 or the scheduling route information J21 is installed in the in-vehicle device 3. The in-vehicle device control unit 30 guides the route to the recommended station by the function of the program.

After starting the guidance of the route to the recommended station, the in-vehicle device control unit 30 monitors whether the vehicle S has reached the recommended station (step SE6).

When detecting that the vehicle S has reached the recommended station (step SE6: YES), the in-vehicle device control unit 30 stops the guidance of the route to the recommended station and executes the following processing (step SE7). That is, based on the station guidance information J27 included in the received guidance control data, the in-vehicle device control unit 30 displays, on the touch panel 35, a station guidance screen G1 on which information for guiding the vehicle S having reached the recommended station to a use lane is displayed.

Figure 10:
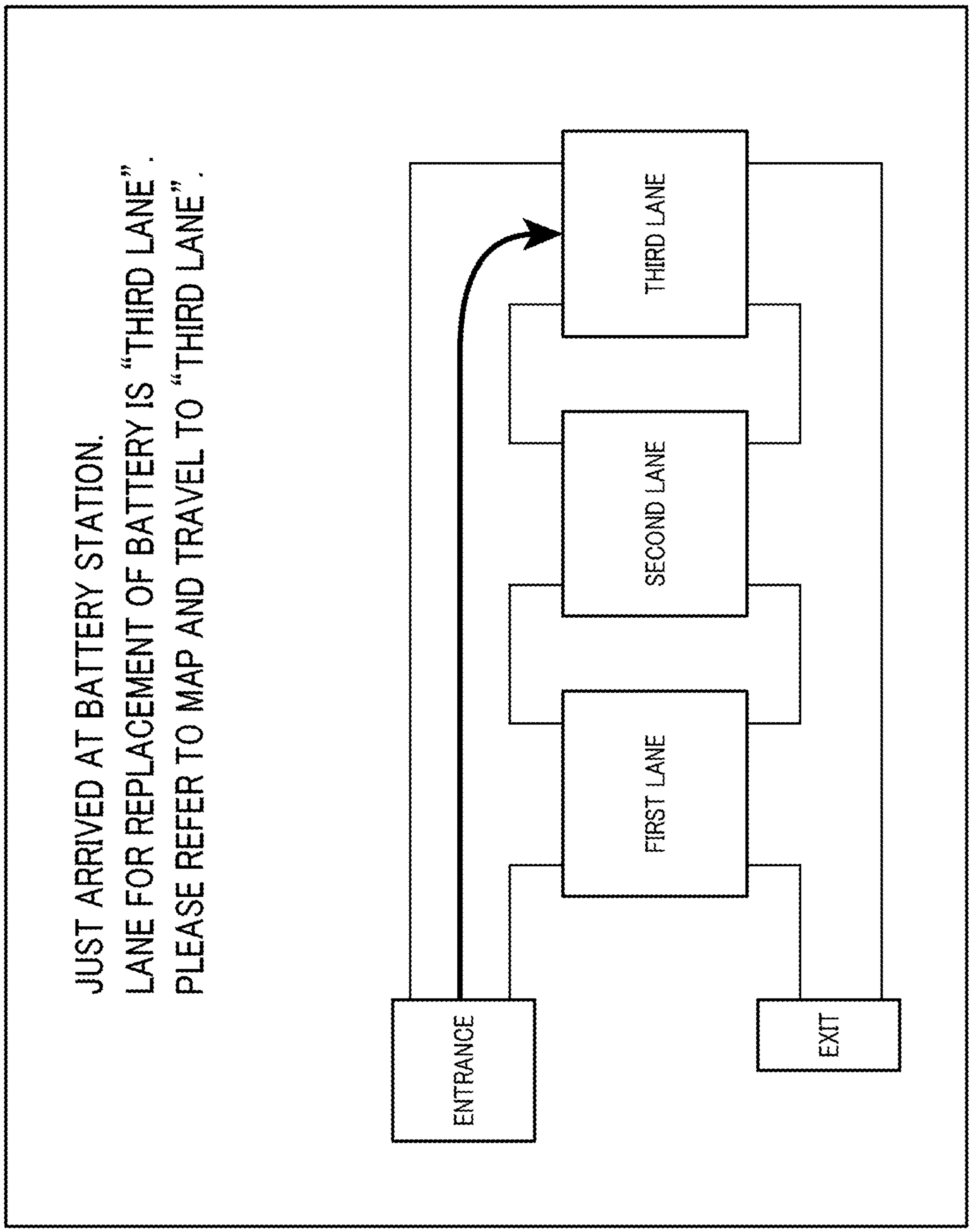
FIG. 10 is a diagram showing a station guidance screen.

FIG. 10 is a diagram showing an example of the station guidance screen G1.

As shown in FIG. 10, a map of the recommended station is displayed on the station guidance screen G1, and a route on which the vehicle S should travel to reach the use lane at the recommended station is displayed on the map.

The user can accurately recognize the route to the use lane by referring to the station guidance screen G1 displayed on the touch panel 35.

Next, an operation of the management device 4 when the vehicle S has reached the lane L will be described.

Here, as described above, the gate device 9 is provided at an entrance of each lane L of the battery station BS. The gate device 9 has a crossing gate that transitions between a state of blocking entry of the vehicle S into the lane L and a state of allowing entry of the vehicle S into the lane L. Furthermore, the gate device 9 has a camera capable of imaging a number plate provided on the front side of the vehicle S which is about to enter the lane L. Furthermore, the gate device 9 has a display panel visually recognizable by a driver who is about to enter the lane L.

The management device control unit 40 of the management device 4 periodically (for example, at an interval of one second) acquires captured image data based on an imaging result of the camera, and performs the following processing. That is, the management device control unit 40 analyzes the captured image data and determines whether the vehicle S has reached the entrance of the lane L. The determination is performed by using existing image recognition techniques such as pattern matching. When detecting that the vehicle S has reached the entrance of the lane L, the management device control unit 40 specifies an area of the number plate of the vehicle S in the captured image data, and performs character recognition on the area to obtain the number plate information J9 recorded on the imaged number plate. Next, based on the reservation management database 42*a*, the management device control unit 40 determines whether a reservation has been registered for the vehicle S corresponding to the acquired number plate information J9.

When a reservation has been registered, the management device control unit 40 sets the crossing gate to the state of allowing entry of the vehicle to the lane L, thereby allowing entry of the vehicle S to the lane L. Furthermore, the management device control unit 40 displays necessary items such as a caution concerning replacement of the battery BT and a charging method.

When no reservation has been registered, the management device control unit 40 sets the crossing gate to the state of blocking entry of the vehicle S into the lane L, and executes the corresponding processing. For example, the management device control unit 40 displays a procedure necessary for replacing the battery BT at the battery station BS on the display panel, and causes the user to recognize the procedure.

Note that although details are omitted, replacement of the battery BT in the lane L is properly performed by the battery replacing device 8 based on an existing technique.

As described above, the control server 2 (information processing device) according to the present embodiment includes the control server control unit 20 (control unit). The control server control unit 20 acquires the device-related information J1 on the vehicle S (driving device) in which a mounted battery BTa (mounting energy supply unit) being a battery BT (energy supply unit) for supplying energy to the power source 10*a* is mounted replaceably, and selects, based on the acquired device-related information J1, a battery station BS at which replacement of the battery BT is recommended out of battery stations BS at which stored batteries BTb (stored energy supply units) being batteries BT replaceable with the mounted battery BTa are stored and the replacement of the mounted battery BTa with the stored batteries BTb is possible.

According to this configuration, based on the device-related information J1 on the vehicle S, the control server 2 can select a battery station BS which is suitable for the vehicle S to perform replacement of the battery BT while reflecting peculiar circumstances of the vehicle S. That is, according to the above configuration, the control server 2 can execute processing corresponding to the replacement of the battery BT at the battery station BS.

Furthermore, in the present embodiment, the battery residual quantity (remaining amount) of the stored battery BTb is managed by the management device 4 so as to be within the storage range (predetermined range) while stored in the battery station BS. When a battery station BS is selected, the control server control unit 20 transmits, to the management device 4, reservation control data (control data) instructing the management device 4 to cause the battery residual quantity of a predetermined stored battery BTb out of stored batteries BTb stored in the selected battery station BS to be equal to a target value over the storage range.

According to this configuration, deterioration of the stored batteries BTb stored in the battery station BS can be suppressed.

Furthermore, in the present embodiment, based on the device-related information J1, the control server control unit 20 estimates a timing at which replacement of the battery BT will be performed at the selected battery station BS, and transmits, to the management device 4, the reservation control data instructing the management device 4 to cause the battery residual quantity of the predetermined stored battery BTb to be equal to the target value before the estimated timing.

According to this configuration, it is possible to set the battery residual quantity to a sufficient state for the stored battery BTb to be replaced with the mounted battery BTa before replacement of the battery BT is performed at the battery station BS.

In the present embodiment, the vehicle S is a moving object that is propelled with energy supplied by the mounted battery BTa.

According to this configuration, for the moving object propelled with energy supplied by the mounted battery BTa, based on the device-related information J1 of the moving object, the control server 2 can select a battery station BS which is suitable to perform replacement of the battery BT while reflecting a characteristic of propelling the moving object with the energy supplied by the mounted battery BTa.

Furthermore, in the present embodiment, the device-related information J1 includes information on the position of the vehicle S. The control server control unit 20 selects a battery station BS based on the device-related information J1 while reflecting the relationship between the position of the vehicle S and the position of the battery station BS.

According to this configuration, the control server 2 can select an appropriate battery station BS which reflects the relationship between the position of the vehicle S and the position of the battery station BS.

Furthermore, in the present embodiment, the control server control unit 20 preferentially selects a battery station BS as the battery station BS is closer to the position of the vehicle S.

Here, it is assumed that the vehicle S can reach a battery station BS more easily as the battery station BS is closer to the current position of the vehicle S. In consideration of this point, according to the above configuration, the convenience of the user can be enhanced.

Furthermore, in the present embodiment, the device-related information J1 includes information on the battery residual quantity of the mounted battery BTa. The control server control unit 20 sets, as a candidate of a battery station BS to be selected, a battery station BS which the vehicle S can reach without causing shortage of the battery residual quantity of the mounted battery BTa among the battery stations BS.

According to this configuration, occurrence of shortage of the battery residual quantity before the vehicle S reaches the battery station BS can be suppressed.

Furthermore, in the present embodiment, the device-related information J1 includes information on a route along which the vehicle S travels to the destination. Based on the device-related information J1, the control server control unit 20 selects a battery station BS while reflecting the route to the destination.

According to this configuration, the control server 2 can select an appropriate battery station BS reflecting the route to the destination.

In the present embodiment, the control server control unit 20 preferentially selects a battery station BS as the battery station BS causes a smaller delay in the arrival timing of the vehicle S at the destination.

According to this configuration, it is possible to suppress the delay of the arrival timing at the destination which is caused by replacement of the battery BT via the battery station BS, thereby enhancing the convenience of the user.

In the present embodiment, the device-related information J1 includes information on the battery residual quantity of the mounted battery BTa. The control server control unit 20 selects one or more battery stations BS at which replacement of the battery BT is performed by the vehicle S on the way to the destination so that the vehicle S reaches the destination without causing shortage of the battery residual quantity of the mounted battery BTa, schedules a route reaching the destination via the selected one or more battery stations BS, and transmits information indicating the scheduled route to the in-vehicle device 3 (external device).

According to this configuration, the control server 2 can suppress shortage of the battery residual quantity from occurring before the vehicle S reaches the destination.

In the present embodiment, the device-related information J1 includes information on the load 11 which is provided in the vehicle S and driven upon reception of supply of energy from the mounted battery BTa, and information on the battery residual quantity of the mounted battery BTa. In a predetermined case, the control server control unit 20 transmits, to the in-vehicle device 3 (the device mounted in the vehicle S), guidance control data (control data) for controlling the load 11 so that energy to be consumed by the load 11 is reduced.

According to this configuration, the control server 2 can more surely prevent the shortage of the battery residual quantity to occur before the vehicle S reaches the battery station BS.

Furthermore, the control server control unit 20 manages the status of utilization of the battery station BS and selects the battery station BS while reflecting the status of utilization of the battery station BS.

According to this configuration, the control server 2 can suppress occurrence of a waiting time at the battery station BS, and enhance the convenience of the user.

Furthermore, the vehicle S travels with energy supplied by the mounted battery BTa.

According to this configuration, for the vehicle S which travels with the energy supplied from the mounted battery BTa, based on the device-related information J1 of the vehicle S, the control server 2 can select the battery station BS which is suitable to perform replacement of the battery BT while reflecting the characteristic that the vehicle S travels with the energy supplied by the mounted battery BTa.

Second Embodiment

Next, a second embodiment will be described.

In the first embodiment described above, the driving device which is targeted for the replacement of the battery BT at the battery station BS is the vehicle S which can travel to the battery station BS with the energy supplied from the mounted battery BT.

On the other hand, in the second embodiment, the replacement of the battery BT at the battery station BS is not performed after the driving device having the battery BT mounted therein has traveled to the battery station BS with energy supplied from the battery BT, but performed in the following way. That is, the mounted battery BTa is first removed from the driving device at a position away from the battery station BS by the user. Then, the user brings the mounted battery BTa removed from the driving device to the battery station BS by a predetermined means, and replaces the mounted battery BTa with a stored battery BTb at the battery station BS. The user brings the battery BT back and mounts the battery BT in the driving device. For example, with respect to driving devices such as an agricultural machine and a stationary type machine, which are not able to travel on roads or are not suitable for traveling on roads, it is assumed that the replacement of the battery BT is performed by the above-described method. In this case, unlike the vehicle S in the above-described first embodiment, since it is unknown when the user arrives at the battery station BS by using what kind of a means, it is impossible to estimate a timing at which the replacement of the battery BT is performed at the battery station BS.

Hereinafter, the second embodiment will be described by exemplifying a case where the driving device is a cultivator K.

Figure 11:
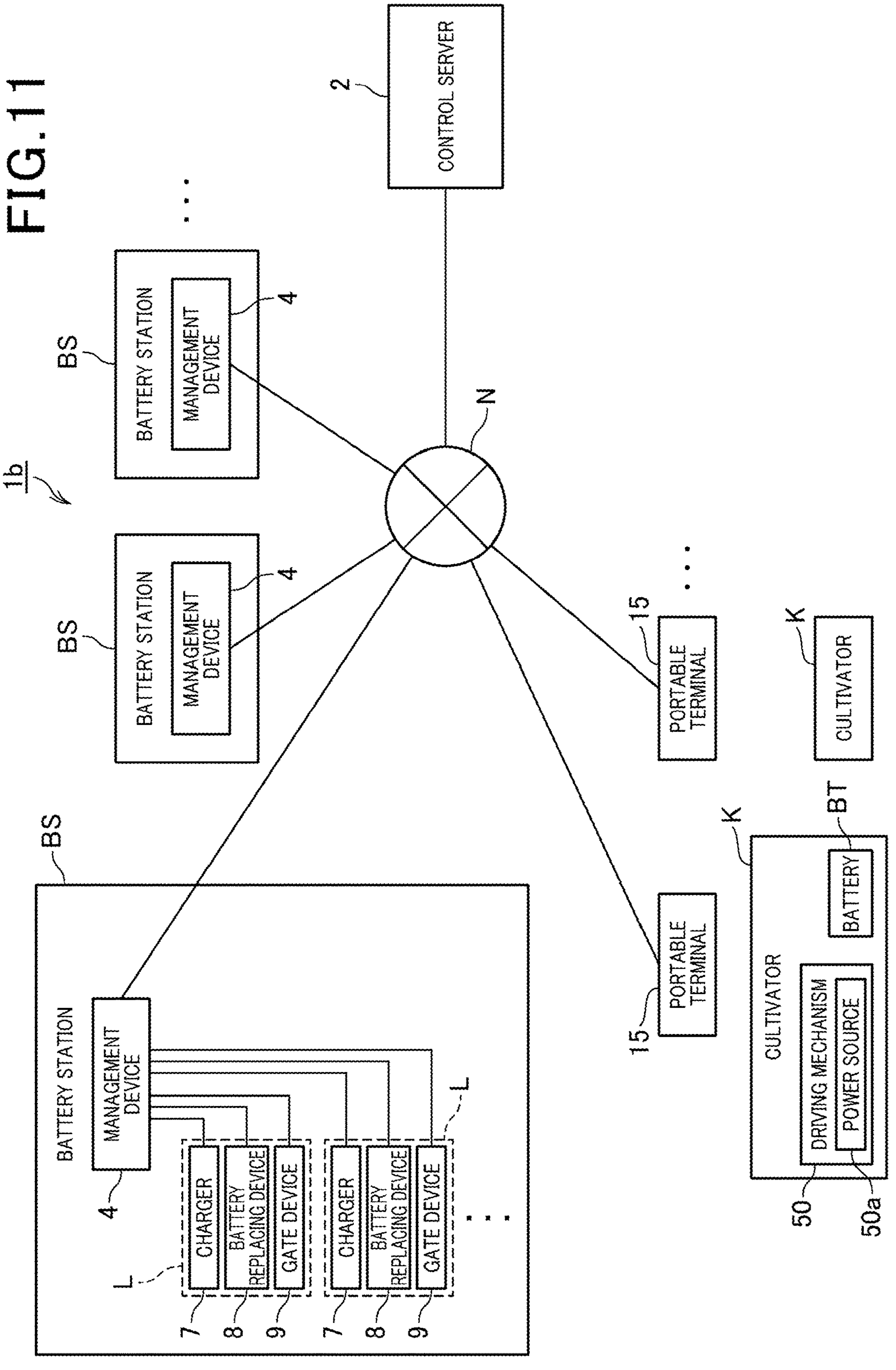
FIG. 11 is a diagram showing a configuration of an information processing system according to a second embodiment.

FIG. 11 is a diagram showing a configuration of the information processing system 1*b* according to the second embodiment.

In the description of the second embodiment, the same components as the first embodiment are represented by the same reference signs as the reference signs appended to the components of the first embodiment, and the description of the same components will be omitted.

As shown in FIG. 11, the information processing system 1*b* includes the control server 2 connected to the network N, the management device 4, and a portable terminal 15. The portable terminal 15 is a portable terminal that a user can carry, and is, for example, a smartphone, a tablet computer, or the like. However, a device corresponding to the portable terminal 15 is not necessarily a portable type, and may be a stationary type. The portable terminal 15 has a function of accessing the network N, and can communicate with equipment (including the control server 2) connected to the network N.

Furthermore, the cultivator K has a battery BT mounted in the cultivator replaceably, and a driving mechanism 50 is driven with energy which is supplied to a power source 50*a* by the battery BT.

The cultivator K does not include any device having a function of accessing the network N (a device corresponding to the in-vehicle device 3 according to the first embodiment).

Figure 12:
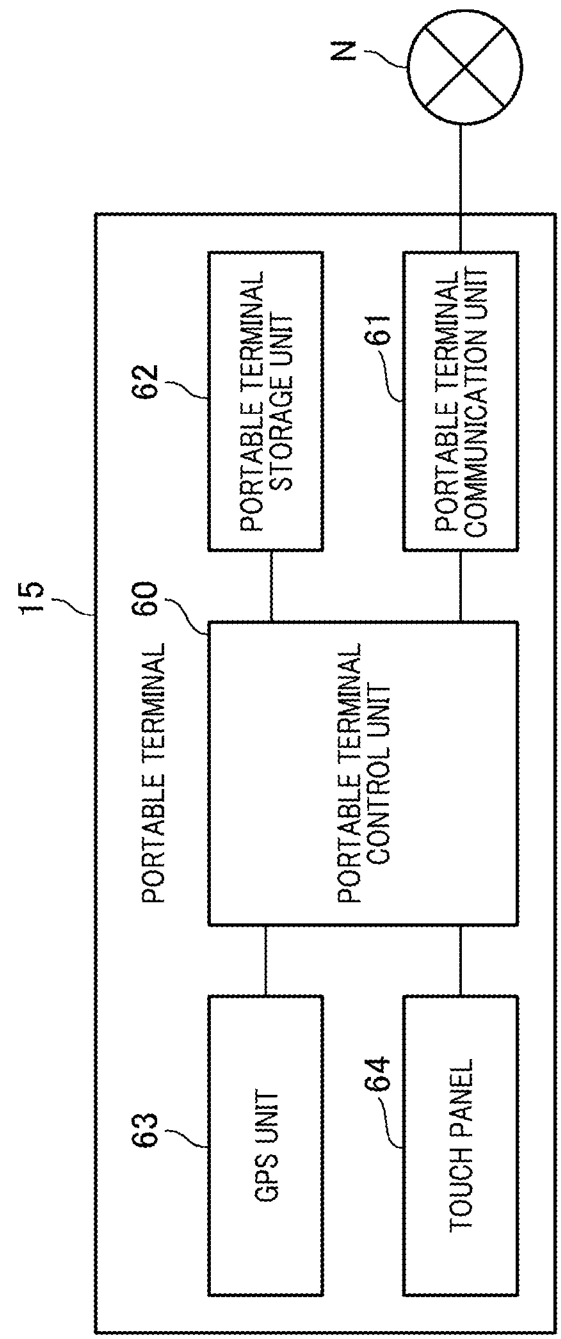
FIG. 12 is a block diagram showing a functional configuration of a portable terminal.

FIG. 12 is a block diagram showing a functional configuration of the portable terminal 15.

As shown in FIG. 12, the portable terminal 15 includes a portable terminal control unit 60, a portable terminal communication unit 61, a portable terminal storage unit 62, a GPS unit 63, and a touch panel 64.

The portable terminal control unit 60 includes CPU, ROM, RAM, other peripheral circuits, and the like, and controls each unit of the portable terminal 15. For example, the portable terminal control unit 60 controls each unit of the portable terminal 15 by cooperation between hardware and software such as reading and executing a control program stored in the ROM by the CPU.

Under the control of the portable terminal control unit 60, the portable terminal communication unit 61 accesses the network N according to predetermined communication standards, and communicates with equipment connected to the network N.

The portable terminal storage unit 62 includes a nonvolatile memory, and stores various data rewritably.

The touch panel 64 has the same function as the touch panel 35 of the in-vehicle device 3 according to the first embodiment.

The GPS unit 63 has the same function as the GPS unit 33 of the in-vehicle device 3 according to the first embodiment.

Figure 13:
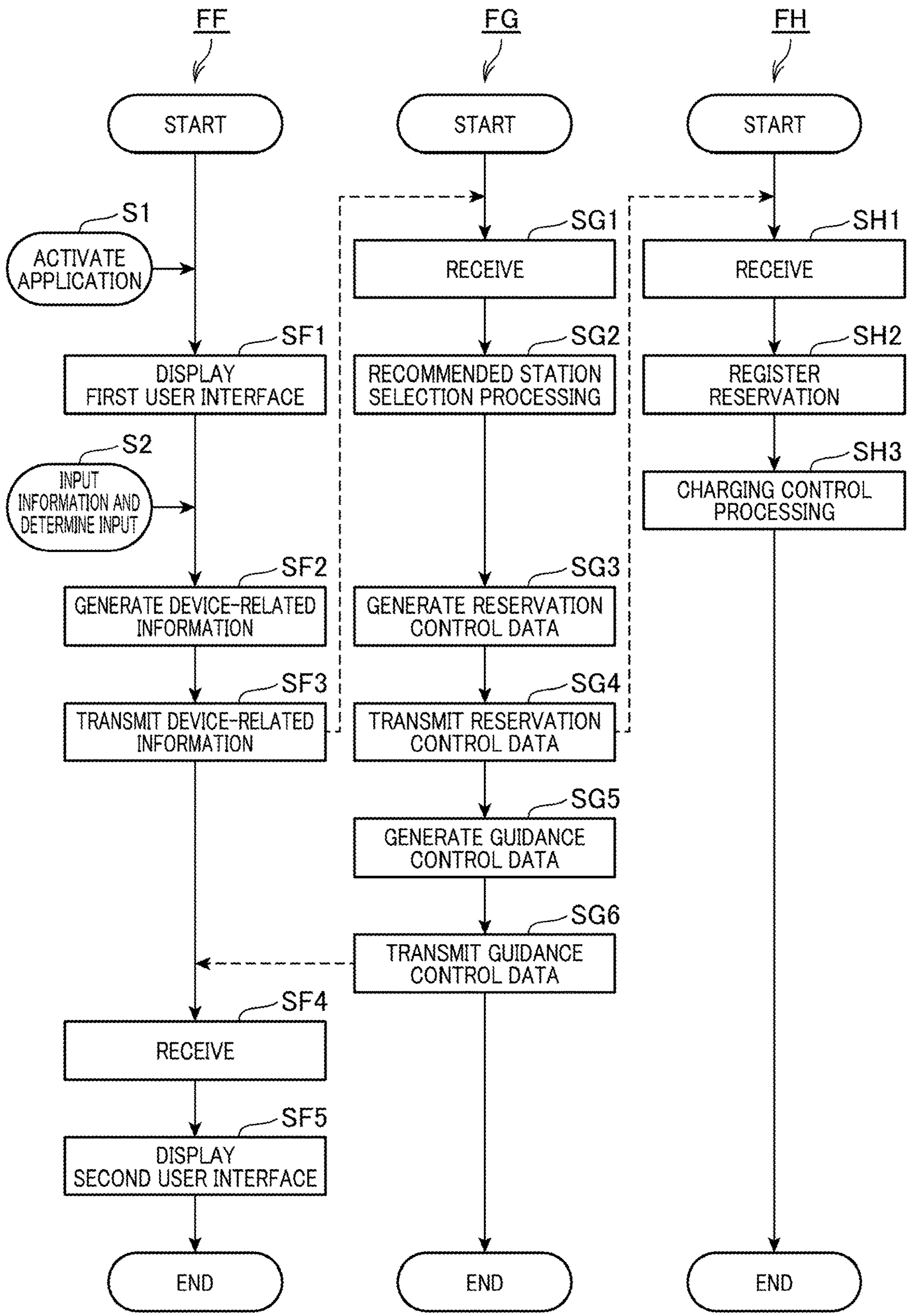
FIG. 13 is a flowchart showing operations of a portable terminal, a control server, and a management device.

FIG. 13 is a flowchart showing operations of the portable terminal 15, the control server 2, and the management device 4 when a user who wishes to replace a mounted battery BTa mounted in the cultivator K reserves a battery station BS by using the function of the control server 2. A flowchart FF in FIG. 13 shows the operation of the portable terminal 15, a flowchart FG shows the operation of the control server 2, and a flowchart FH shows the operation of the management device 4.

In the present embodiment, replacement of the battery BT is manually performed in the lane L at the battery station BS. The attachment/detachment of the battery BT to/from the battery accommodating portion of the charger 7 provided in each lane L can be automatically performed by the battery replacing device 8, or can be manually performed by a human. After reserving the battery station BS by a method described later, the user goes to the reserved lane L. In the lane L, the user manually detaches a battery BT (stored battery BTb) mounted on the charger 7, and also accommodates a brought battery BT (mounted battery BTa) into the battery accommodating portion of the charger 7.

Upon reservation of the battery station BS, the user activates a predetermined application installed in the portable terminal 15 owned by the user (step S1). The predetermined application includes a function of providing a user interface for inputting information necessary for reservation of the battery station BS, a function of communicating with the control server 2 and transmitting information necessary for reservation of the battery station BS, and the like. The predetermined application is provided, for example, by a predetermined subject providing a service relating to the reservation of the battery station BS. The user installs the predetermined application in the portable terminal 15 owned by the user in advance by a predetermined means.

As shown in the flowchart FF of FIG. 13, according to the activation of the predetermined application, the portable terminal control unit 60 of the portable terminal 15 displays a first user interface UI1 on the touch panel 64 by the function of the predetermined application (Step SF1).

Figure 14:
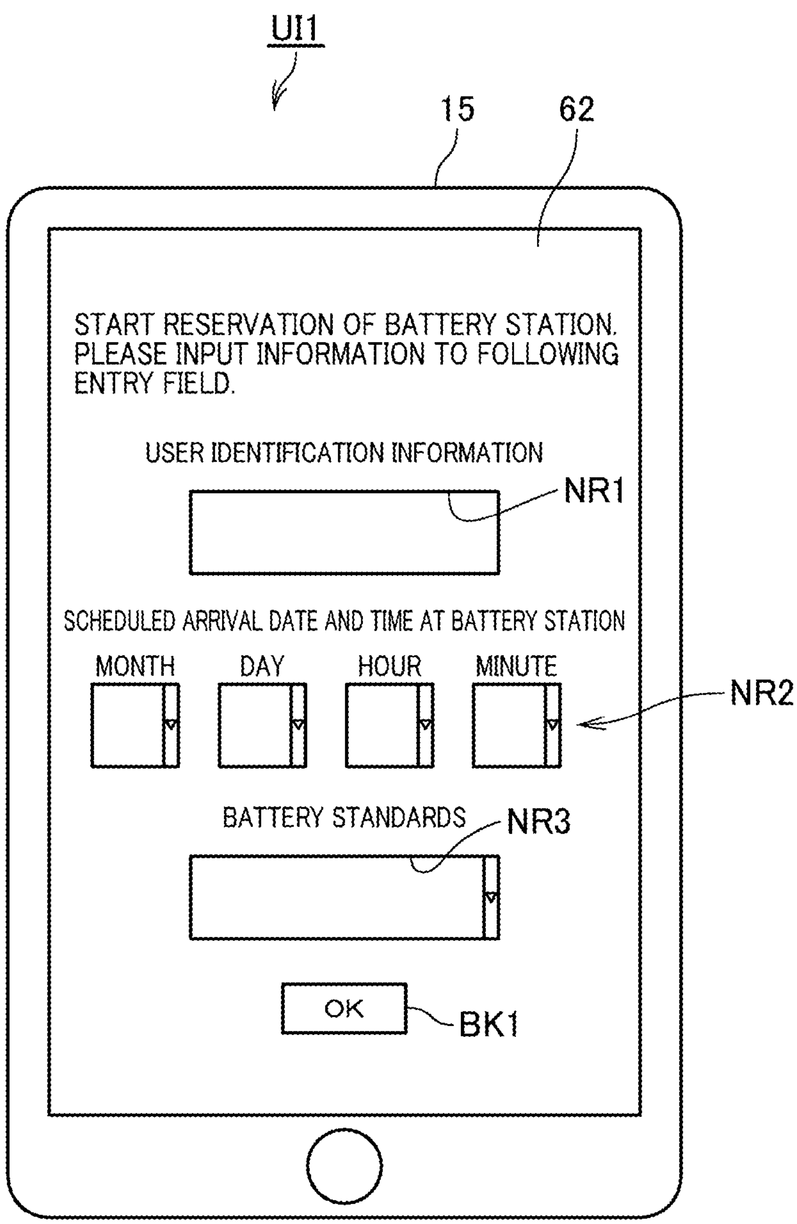
FIG. 14 is a diagram showing a first user interface.

FIG. 14 is a diagram showing an example of the first user interface UI1.

As shown in FIG. 14, the first user interface UI1 includes an entry field NR1 for inputting the user identification information J8, an entry field NR2 for inputting information indicating the date and time scheduled to arrive at the battery station BS (hereinafter referred to as "scheduled arrival date-and-time information J30"), and an entry field NR3 for inputting battery standards information J6 indicating the standards of the battery BT mountable in the cultivator K.

The first user interface UI1 also includes an enter button BK1 which determines inputs to the entry field NR1, the entry field NR2, and the entry field NR3.

The user inputs the user identification information J8 to the entry field NR1, inputs the scheduled arrival date-and-time information J30 into the entry field NR2, inputs the battery standards information J6 into the entry field NR3, and operates the enter button BK1 (step S2).

When detecting that the enter button BK1 is operated, the portable terminal control unit 60 generates device-related information J1 based on information input to the first user interface UI1 (step SF2).

In the present embodiment, the device-related information J1 includes the user identification information J8, the scheduled arrival date-and-time information J30, the battery standards information J6, and portable terminal position information J31. The portable terminal position information J31 is information indicating the position of the portable terminal 15.

Note that the battery standards information J6 is information indicating the battery BT mountable in the cultivator K, and corresponds to "information on the driving device".

In step SF2, the portable terminal control unit 60 acquires the user identification information J8, the scheduled arrival date-and-time information J30, and the battery standards information J6 based on the input to the first user interface UI1. Furthermore, in step SF2, the portable terminal control unit 60 acquires the portable terminal position information J31 based on the input from the GPS unit 63.

Next, the portable terminal control unit 60 controls the portable terminal communication unit 61 to transmit the generated device-related information J1 to the control server 2 (step SF3).

As shown in the flowchart FG of FIG. 13, the control server control unit 20 of the control server 2 controls the control server communication unit 21 to receive the device-related information J1 (step SG1).

Next, the control server control unit 20 executes the recommended station selection processing based on the received device-related information J1 (step SG2).

In the recommended station selection processing according to the present embodiment, the control server control unit 20 executes the following processing to select a recommended station.

That is, the control server control unit 20 sets the following lanes as candidates of the recommended station based on the scheduled arrival date-and-time information J30 and the battery standards information J6 included in the received device-related information J1, the compliant standards information J17 held by each record of the station management database 22*a*, and the use hours information J18. That is, the control server control unit 20 sets, as candidates of the recommended station, a battery stations BS having lanes L which are usable at the data and time when the user arrives at the battery stations BS and in which batteries BT having the standards corresponding to the standards of the battery BT mountable in the cultivator K are stored.

Furthermore, based on the station position information J11 held in each record of the station management database 22*a*, the control server control unit 20 preferentially selects, as the recommended station, a battery station BS which is closer to a position indicated by the portable terminal position information J31. The reason for this is as follows. That is, the position indicated by the portable terminal position information J31 is the position of the user at the present moment, and by selecting a battery station BS located at a position close to the position of the user at the present moment as the recommended station, it is possible to increase the possibility that a battery station BS to which the user can easily goes is selected as the recommended station.

Next, the control server control unit 20 generates reservation control data (control data) (step SG3).

The reservation control data according to the present embodiment includes the user identification information J8, the lane identification information J15 of a use lane, and the scheduled arrival date-and-time information J30, and instructs the following items. That is, the reservation control data instructs to reserve that the user corresponding to the user identification information J8 uses the lane L corresponding to the lane identification information J15 at the date and time indicated by the scheduled arrival date-and-time information J30. Furthermore, the reservation control data instructs that the battery residual quantity of a stored battery BTb to be replaced with the mounted battery BTa in the lane L corresponding to the lane identification information J15 is set to a target value by the date and time indicated by the scheduled arrival date-and-time information J30

Note that the control server control unit 20 acquires the lane identification information J15 of the use lane by the same method as the method described in the first embodiment.

Next, the control server control unit 20 controls the control server communication unit 21 to transmit the reservation control data generated in step SG3 to the management device 4 provided in the recommended station (step SG4).

As shown in the flowchart FH of FIG. 13, the management device control unit 40 of the management device 4 controls the management device communication unit 41 to receive the reservation control data (step SH1).

Next, based on the received reservation control data, the management device control unit 40 registers one record corresponding to the reservation in the reservation management database 42*a* (step SH2). Specifically, based on the scheduled arrival date-and-time information J30 included in the reservation control data, the management device control unit 40 calculates hours in which the lane L corresponding to the lane identification information J15 included in the data is used. Next, the management device control unit 40 resisters, in the reservation management database 42*a*, a record having the lane identification information J15 included in the reservation control data, the reserved hours information J24 indicating the calculated hours, and the user identification information J8 included in the reservation control data.

One record in the reservation management database 42*a* has the number plate information J9 in the first embodiment, but has the user identification information J8 instead of the number plate information J9 in the second embodiment.

Next, the management device control unit 40 executes charging control processing based on the received reservation control data (step SH3).

The charge control processing according to the second embodiment is the same processing as the charge control processing described in step SC3 of the first embodiment.

After transmitting the reservation control data, the control server control unit 20 generates guidance control data (step SG5).

The guidance control data according to the present embodiment includes the station position information J11 and the station guidance information J27. In the present embodiment, the station guidance information J27 includes information indicating the address of the recommended station, information indicating the telephone number of the recommended station, and information indicating the name of the recommended station. The control server control unit 20 acquires the station position information J11 based on the station management database 22*a*, and also generates the station guidance information J27.

Next, the control server control unit 20 controls the control server communication unit 21 to transmit the guidance control data generated in step SG5 to the portable terminal 15 (step SG6).

As shown in the flowchart FF of FIG. 13, the portable terminal control unit 60 of the portable terminal 15 controls the portable terminal communication unit 61 to receive the guidance control data (step SF4).

Next, the portable terminal control unit 60 displays a second user interface UI2 on the touch panel 64 by the function of the application based on the received guidance control data (step SF5).

The user can display the second user interface UI2 on the touch panel 64 at an arbitrary timing by performing a predetermined operation even after erasing the second user interface UI2 from the display once.

Figure 15:
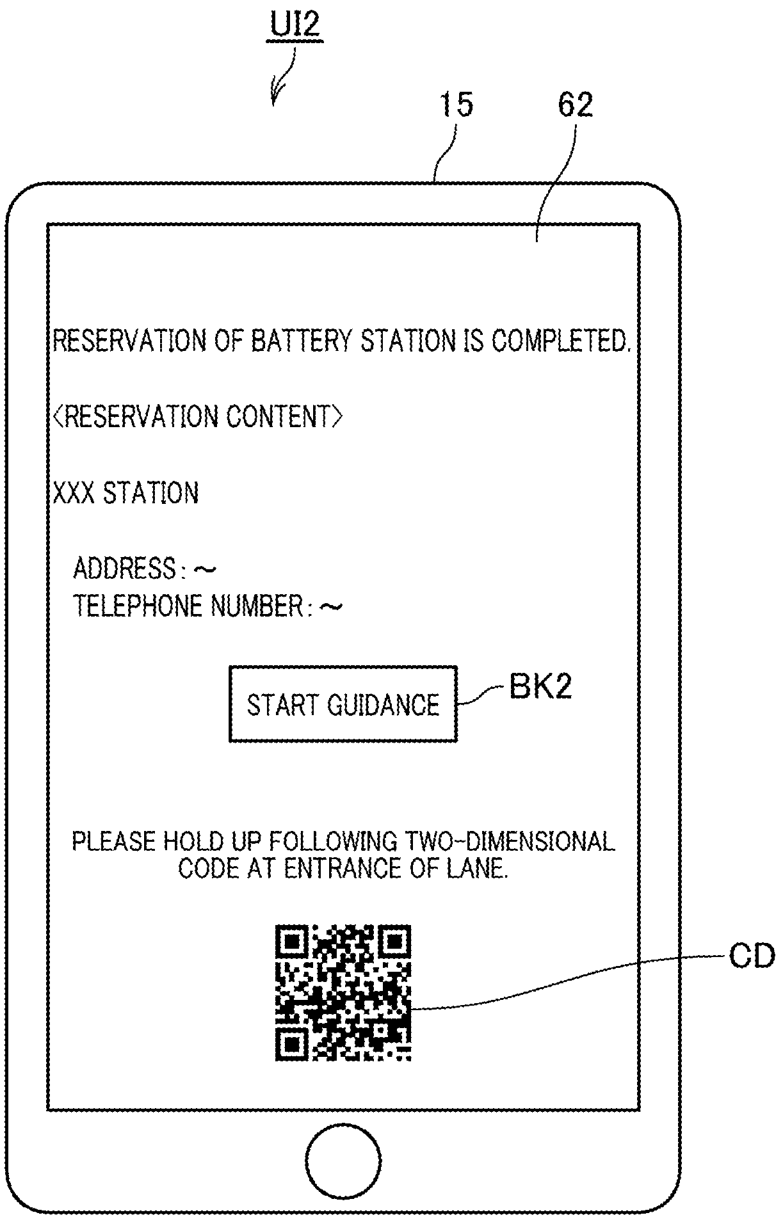
FIG. 15 is a diagram showing a second user interface.

FIG. 15 is a diagram showing an example of the second user interface UI2.

As shown in FIG. 15, information indicating that the reservation of the battery station BS is completed is displayed on the second user interface UI2.

Furthermore, information indicating the name of the reserved battery station BS (recommended station), information indicating the address, and information indicating the telephone number are displayed on the second user interface UI2.

Furthermore, a two-dimensional code CD is displayed on the second user interface UI2. The two-dimensional code CD is a code in which the user identification information J8 is recorded. By the function of the application, the portable terminal control unit 60 generates the two-dimensional code in which the user identification information J8 is recorded.

A guidance start button BK2 is displayed on the second user interface UI2. The guidance start button BK2 is a button for instructing start of guidance to be executed until replacement of the battery BT has been performed.

When detecting that the guidance start button BK2 has been operated, the portable terminal control unit 60 changes over the second user interface UI2 and starts the guidance to be executed until replacement of the battery BT has been performed.

More specifically, the portable terminal control unit 60 displays a map on the touch panel 64 and displays the position of the portable terminal 15 (=the position of the user) and the route to the recommended station on the map, thereby guiding the route up to the recommended station. The portable terminal control unit 60 executes the processing related to the guidance of the route up to the recommended station, for example, by the following method. That is, the portable terminal control unit 60 communicates with an external server device (which may be the control server 2) that provides a service relating to the guidance of the route to transmit information necessary to calculate the route (for example, the station position information J11, etc.) to the external server device and receive information 1 necessary to guide the route (for example, information on the map, information on the route, etc.), and executes processing relating to the guidance of the route based on the received information.

Furthermore, when detecting that the position of the portable terminal 15 has reached the position of the recommended station, the portable terminal control unit 60 stops the guidance of the route up to the recommended station, and guides the user having reached the recommended station to a use lane based on the station guidance information J27. The control server control unit 20 displays a screen similar to the station guidance screen G1 according to the first embodiment on the touch panel 64 to perform the guidance to the use lane.

Next, an operation of the management device 4 when the user bringing the mounted battery BTa has reached the lane L will be described.

The management device control unit 40 of the management device 4 periodically (for example, at an interval of one second) acquires captured image data based on an imaging result of the camera equipped to the gate device 9, and performs the following processing. That is, the management device control unit 40 analyzes the captured image data, and determines whether a person who does not get in the vehicle S has reached the entrance of the lane L. This determination is performed, for example, by using existing face recognition techniques. When detecting that a person who does not get in the vehicle S has arrived at the entrance of the lane L, the management device control unit 40 displays the following information on the display panel of the gate device 9. That is, the management device control unit 40 displays, on the display panel, information instructing the user to hold up the two-dimensional code CD to the camera. Based on the information displayed on the display panel, the user performs a predetermined operation on the portable terminal 15 to display the second user interface UI2, and holds up to the camera a display face of the portable terminal 15 on which the second user interface UI2 is displayed. Note that the gate device 9 may be configured so as to have a camera for two-dimensional code CD separately from the camera for imaging the entrance of the lane L.

The management device control unit 40 acquires captured image data based on the imaging of the two-dimensional code CD, specifies an area of the two-dimensional code CD in the captured image data, and analyzes the area to acquire the user identification information J8 recorded in the two-dimensional code CD. Next, based on the reservation management database 42*a*, the management device control unit 40 determines whether a reservation has been registered for the user corresponding to the acquired user identification information J8.

When the reservation has been registered, the management device control unit 40 sets the crossing gate to the state of allowing entry of the vehicle S into the lane L (a state where a person who does not get in the vehicle S can also enter the lane L), and allows the user to enter the lane L. Furthermore, the management device control unit 40 displays, on the display panel, necessary items such as a caution concerning replacement of the battery BT and a charging method.

When no reservation has been registered, the management device control unit 40 sets the crossing gate to the state of blocking entry of the vehicle S into the lane L (a state where a person who does not get in the vehicle S cannot also enter), and performs corresponding processing. For example, the management device control unit 40 displays, on the display panel, a procedure necessary for replacing the battery BT at the battery station BS to cause the user to recognize the procedure.

Note that although details are omitted, replacement of a battery BT within the lane L is appropriately performed by the user. In order to support this user, for example, measures such as installation of a medium on which a procedure for manually replacing a battery BT is described may be taken According to the above-described second embodiment, the user can smoothly replace a battery BT at an appropriate battery station BS, and it is possible to suppress deterioration of batteries BT stored in the battery station BS.

Note that each of the above-described embodiments merely shows one aspect of the present invention, and may be subjected to any arbitrary modification and application within the scope of the present invention.

For example, in each of the above-described embodiments, the energy supply unit is a secondary battery. However, the energy supply unit is not necessarily a secondary battery, but may be a fuel cell or a biological battery. That is, the energy supply unit may be any unit as long as the unit supplies energy to a power source and is replaceably mounted in a driving device.

Furthermore, in each embodiment, the control server 2 functions as an information processing device. However, the device functioning as the information processing device is not limited to the control server 2. In the first embodiment, the in-vehicle device 3 or the vehicle control device 13 may function as the information processing device, and equipment other than the control server 2, which is connectable to the in-vehicle device 3, may function as the information processing device. Still furthermore, in the second embodiment, equipment other than the control server 2, which is connectable to the portable terminal 15, may function as the information processing device. In each embodiment, an arithmetic processing function and a communication function may be implemented in the battery BT, and the battery BT may function as the information processing device. Furthermore, plural devices may communicate with one another and cooperate with one another to function as an information processing device. In this case, the combination of the plural devices corresponds to an information processing device. That is, the information processing device may be any device as long as the device can execute processing similar to the processing of the control server 2 described in each embodiment.

In each of the embodiments, the driving device has been described by citing examples, but the driving device is not limited to the device exemplified in each embodiment.

Furthermore, in each of the embodiments, the replacement of the battery BT performed at the battery station BS has been described, as an example, by illustrating a case where the replacement of the battery BT is automatically performed by the battery replacing device 8 in the first embodiment and a case where the replacement of the battery BT is manually performed by the user in the second embodiment. However, the method of replacing the battery BT is not limited to the illustrated method.

Still furthermore, the functional blocks of each device of the information processing system 1 can be arbitrarily realized by hardware and software, and do not suggest specific hardware configurations.

Still furthermore, the processing unit in the flowchart shown in the figures is obtained by dividing the processing of each device according to main processing contents in order to make the processing of each device easier to understand. The invention of the present application is not limited by the manner of dividing into the processing units and the names of the processing units. The processing of each device can be divided into more processing units according to the processing contents. The division can be performed so that one processing unit includes more processing. Furthermore, when similar processing can be performed, the processing order of the above-described flowcharts is not limited to the illustrated example.

REFERENCE SIGNS LIST

1, 1*b* information processing system
2 control server (information processing device)
4 management device
7 charger
10 Travel mechanism (driving mechanism)
10*a* power source
11 load
11*a* power source
20 control server control unit (control unit)
50 driving mechanism
50*a* power source
BS battery station (facility)
BT battery (energy supply unit)
BTa mounted battery (mounted energy supply unit)
BTb stored battery (stored energy supply unit)
S vehicle (driving device, moving object)
K cultivator (driving unit)

The invention claimed is:

1. An information processing device comprising a CPU for acquiring device-related information on a moving object in which a mounted energy supply unit serving as an energy supply unit for supplying energy to a power source is replaceably mounted and which is propelled with energy supplied by the mounted energy supply unit, and selecting a facility recommended to perform replacement of the energy supply unit out of facilities that store a stored energy supply unit serving as an energy supply unit replaceable with the mounted energy supply unit, and that are able to replace the mounted energy supply unit with the stored energy supply unit, wherein the device-related information includes information on a residual quantity of the mounted energy supply unit, and information on a load that is provided to the moving object and is driven upon reception of supply of energy from the mounted energy supply unit, the CPU selects one or more facilities based on the device-related information so that the moving object reaches without causing shortage of the residual quantity of the mounted energy supply unit, generates, after the selection of the facility, a route information for the CPU to perform route guidance to the one or more facilities selected, determines, after the selection of the facility, whether control of the load is necessary so that the moving object reaches the selected facility, generates a load control information for controlling the load so that energy consumed by the load is reduced when it is determined that the control of the load is necessary, and transmits, to a device mounted in the moving object, control data including the route information and the load control information, a residual quantity of the stored energy supply unit is managed by a management device so as to be within a predetermined range during storage of the stored energy supply unit in the facility, when the facilities are selected, the CPU transmits, to the management device, control data for instructing the management device to cause a residual quantity of a predetermined stored energy supply unit out of the stored energy supply units stored in the selected facilities to be equal to a target value over the predetermined range, the CPU calculates a date-and-time at which the vehicle reaches the selected facilities where the replacement of the energy supply unit from the mounted energy supply unit to the predetermined stored energy supply unit is performed, and transmits, to the management device, control data for instructing the management device to start charging for the purpose of setting the residual quantity to the target value so that the predetermined stored energy supply unit reaches the target value at a timing before a predetermined time period from the date-and-time at which the vehicle reaches the selected facilities.

2. The information processing device according to claim 1, wherein after the selection of the facility, the CPU transmits, to the management device for managing the stored energy supply unit of the selected facility, reservation control data for instructing the management device to reserve use of the stored energy supply unit, and determines whether control of the load is necessary so that the moving object reaches the facility after the reservation control data is transmitted.

3. The information processing device according to claim 1, wherein the load is driven by a power source different from the power source for causing the moving object to travel.

4. The information processing device according to claim 1, wherein the information processing device is configured as a server which is a separate body from the moving object and mounted in the moving object to detect a position of the moving object and a residual quantity of the mounted energy supply unit, and can communicate with a device for controlling the load, and the CPU transmits the control data to the device mounted in the moving object when it is determined that control of the load is necessary so that the moving object reaches the facility.

5. The information processing device according to claim 1, wherein the device-related information includes information on a position of the moving object, and the CPU selects the facility based on the device-related information while reflecting a relationship between the position of the moving object and a position of the facility.

6. The information processing device according to claim 5, wherein the CPU selects the facility as the facility is closer to the position of the moving object.

7. The information processing device according to claim 1, wherein the device-related information includes information on a route on which the moving object travels up to a destination, and based on the device-related information, the CPU selects the facility while reflecting the route up to the destination.

8. The information processing device according to claim 7, wherein the CPU selects the facility as the facility causes a smaller delay in an arrival timing of the moving object at a destination.

9. The information processing device according to claim 7, wherein the device-related information includes information on a residual quantity of the mounted energy supply unit, and the CPU selects the one or more facilities at which replacement of an energy supply unit is performed up to the destination so that the moving object reaches the destination without causing shortage of the residual quantity of the mounted energy supply unit, schedules a route reaching the destination via the one or more facilities selected, and transmits information indicating the scheduled route to an external device.

10. The information processing device according to claim 7, wherein the CPU manages status of utilization of the facility, and selects the facility while reflecting the status of utilization of the facility.

11. The information processing device according to claim 1, wherein the moving object is a vehicle configured for transporting a user and traveling with energy supplied by the mounted energy supply unit.

* * * * *